US011756053B2

(12) United States Patent
Andon et al.

(10) Patent No.: US 11,756,053 B2
(45) Date of Patent: *Sep. 12, 2023

(54) SYSTEMS AND METHODS FOR PROVISIONING CRYPTOGRAPHIC DIGITAL ASSETS FOR BLOCKCHAIN-SECURED RETAIL PRODUCTS

(71) Applicant: NIKE, Inc., Beaverton, OR (US)

(72) Inventors: Christopher Andon, Portland, OR (US); Hien Tommy Pham, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/684,356

(22) Filed: Mar. 1, 2022

(65) Prior Publication Data
US 2022/0188839 A1 Jun. 16, 2022

Related U.S. Application Data

(60) Division of application No. 15/931,764, filed on May 14, 2020, now Pat. No. 11,295,318, which is a (Continued)

(51) Int. Cl.
*H04L 9/08* (2006.01)
*G06F 16/23* (2019.01)
(Continued)

(52) U.S. Cl.
CPC ..... *G06Q 30/0185* (2013.01); *G06F 16/2379* (2019.01); *G06Q 10/10* (2013.01);
(Continued)

(58) Field of Classification Search
CPC . H04L 9/0866; H04L 9/0643; H04L 2209/38; G06F 16/284; G06F 7/588; G06F 16/2457; G06Q 10/0875
See application file for complete search history.

(56) References Cited

U.S. PATENT DOCUMENTS

| 11,238,176 B1 | 2/2022 | Vax et al. |
| 2010/0185510 A1 | 7/2010 | Maier et al. |

(Continued)

FOREIGN PATENT DOCUMENTS

| CN | 102567876 A | 7/2012 |
| CN | 105956923 A | 9/2016 |

(Continued)

*Primary Examiner* — Mohammed Waliullah
(74) *Attorney, Agent, or Firm* — Quinn IP Law

(57) ABSTRACT

Presented are cryptographic digital assets for retail products, methods for making/using such cryptographic digital assets, and computing systems for generating, intermingling, and exchanging blockchain-protected products. A method for provisioning cryptographic digital assets associated with retail product transfers includes broadcasting notifications of a future transaction of a retail product, and receiving, over a distributed computing network from the computing devices of multiple users, requests to participate in the transaction. A select number of users is added to a virtual line associated with the retail product transaction; from the virtual line, a first user is selected to receive the retail product and a second user is selected to receive a cryptographic digital asset containing a digital retail product and a unique digital asset code. The cryptographic digital asset is transferred to the second user's digital wallet, and the unique digital asset code is recorded on a record block of a blockchain ledger.

25 Claims, 12 Drawing Sheets

Related U.S. Application Data continuation-in-part of application No. 16/707,720, filed on Dec. 9, 2019, now Pat. No. 11,113,754, which is a continuation-in-part of application No. 16/423,671, filed on May 28, 2019, now Pat. No. 10,505,726.

(60) Provisional application No. 62/776,699, filed on Dec. 7, 2018.

(51) Int. Cl.

| | | |
|---|---|---|
| *H04L 67/10* | (2022.01) | |
| *H04L 9/00* | (2022.01) | |
| *G06Q 30/018* | (2023.01) | |
| *G06Q 20/36* | (2012.01) | |
| *G06Q 30/0601* | (2023.01) | |
| *G06Q 10/10* | (2023.01) | |
| *G06Q 20/04* | (2012.01) | |

(52) U.S. Cl.
CPC ......... *G06Q 20/0457* (2013.01); *G06Q 20/36* (2013.01); *G06Q 30/0633* (2013.01); *H04L 9/0894* (2013.01); *H04L 67/10* (2013.01); *G06Q 2220/10* (2013.01); *H04L 9/50* (2022.05)

(56) References Cited

U.S. PATENT DOCUMENTS

| | | | |
|---|---|---|---|
| 2014/0224867 A1* | 8/2014 | Werner | G06Q 20/203 |
| | | | 235/375 |
| 2017/0052676 A1 | 2/2017 | Pulier et al. | |
| 2018/0068359 A1 | 3/2018 | Preston et al. | |
| 2018/0268483 A1 | 9/2018 | Jayaram et al. | |
| 2018/0294047 A1* | 10/2018 | Hosseini | G06F 16/258 |
| 2019/0141021 A1* | 5/2019 | Isaacson | G06Q 50/01 |
| 2019/0237176 A1* | 8/2019 | O'Brien | H04L 9/006 |
| 2020/0160289 A1 | 5/2020 | Mahajan et al. | |
| 2020/0202668 A1* | 6/2020 | Cotta | A63F 13/792 |
| 2021/0082044 A1* | 3/2021 | Sliwka | G06Q 40/025 |

FOREIGN PATENT DOCUMENTS

| | | |
|---|---|---|
| CN | 107636662 A | 1/2018 |
| CN | 107730188 A | 2/2018 |
| CN | 108764989 A | 11/2018 |
| JP | 2018055203 A | 4/2015 |
| JP | 2018530806 A | 10/2018 |
| JP | 2018171271 A | 11/2018 |
| TW | 201003437 A | 1/2010 |
| TW | I486896 B | 6/2015 |

* cited by examiner

SYSTEMS AND METHODS FOR PROVISIONING CRYPTOGRAPHIC DIGITAL ASSETS FOR BLOCKCHAIN-SECURED RETAIL PRODUCTS

CLAIM OR PRIORITY AND CROSS-REFERENCE TO RELATED APPLICATIONS

This application is a divisional of U.S. patent application Ser. No. 15/931,764, which was filed on May 14, 2020, is now allowed, and is a continuation-in-part of U.S. patent application Ser. No. 16/707,720, which was filed on Dec. 9, 2019, is now U.S. Pat. No. 11,113,754 B2, and is a continuation-in-part of U.S. patent application Ser. No. 16/423,671, which was filed on May 28, 2019, is now U.S. Pat. No. 10,505,726 B1, and claims the benefit of priority to U.S. Provisional Patent No. 62/776,699, which was filed on Dec. 7, 2018. All of the foregoing applications are incorporated herein by reference in their respective entireties and for all purposes.

TECHNICAL FIELD

The present disclosure relates generally to retail products, such as footwear and apparel. More particularly, aspects of this disclosure relate to decentralized computing systems with control logic for creating and distributing cryptographic digital assets for securing retail products and digital design files thereof.

BACKGROUND

Manufacturers of quality retail products, such as high-end footwear and apparel, have long been plagued by the sale of counterfeit products, namely imitation goods that are made with the intent to deceive buyers into believing that they are purchasing the true manufacturer's authentic goods. Similar issues exist within the digital realm, where digital products are often subject to unauthorized reproduction and sale. Unauthorized production and counterfeit reproduction of goods can erode a brand's value and/or exclusivity, can negatively affect a company's profitability, and may compromise a user's subjective perception of the product as "collectable."

Many anti-counterfeiting techniques have been developed to help identify counterfeit goods and to prevent illicit sales of such counterfeits. Unfortunately, within the digital realm, supply is often unconstrained—if not by the original developer, then by a subsequent party who may freely (or illicitly) duplicate the digital object in its entirety. This often complicates a brand owner's ability to control the exclusivity of a digital object and, thus, have influence regarding the value of that object. The lack of control over digital-object exclusivity then erodes the opportunity for free brand promotion by product enthusiasts and collectors who are in search of that object (e.g., as often occurs upon the release of limited production sneakers by "sneakerheads").

Market participants and brand enthusiasts in a free market typically assign a higher value to an object if there is limited supply and/or if there is excess demand for that object. While these realities are obvious in the physical real world (particularly to an avid collector), similar market realities also exist within a digital realm. With the proliferation of first and third person video games involving customizable skins, apparel, and gear, there exists an opportunity to engage and influence users in the digital realm via collectable objects so that they may be more engaged with a brand in the physical world. Likewise, there exists a need for a retailer to more directly influence and/or control the nature and ultimate supply of digital objects within this virtual market.

SUMMARY

Presented herein are cryptographic digital assets for retail products, such as footwear and apparel, methods for provisioning and methods for intermingling such cryptographic digital assets, and decentralized computing systems with attendant control logic for generating, intermingling, and exchanging blockchain-secured digital shoes and apparel. More specifically, many of the presently described features rely on the trust established in and by blockchain technology to enable a company to control the creation, distribution, expression, and use of tangible products and digital objects that represent their brand. Unlike typical digital assets that are freely reproducible without loss of content or quality, the use of discrete recordation of ownership via blockchain technology eliminates the ability for simple digital reproductions of the digital objects. In doing so, the company has the ability to control or limit the overall supply of the digital objects (or object trait) and may create controlled scarcity if so desired.

The present disclosure contemplates that, in some examples, the digital object may be representative of: a physical object offered for retail sale; a 2D or 3D design rendering or design file that may be suitable for future production; a virtual representation of an object that is not presently intended for physical creation/production; or other such objects. To further promote brand engagement and use of the digital object, the visual expression of a displayed digital object may be altered by the user's use of the object, the user's use of a related retail product or app, or other such measures of object/brand engagement. In addition, the attributes of the digital object and/or its visual expression may affect how the object or the user-controlled character performs within a video game context.

By way of example, and not limitation, there are presented cryptographic digital assets that are secured through a blockchain ledger of transaction blocks. These digital assets may function, at least in part, to connect a real-world product, such as a physical shoe, to a virtual collectible, such as a digital shoe. When a consumer buys a genuine pair of shoes—colloquially known as "kicks"—a digital representation of a shoe may be generated, linked with the consumer, and assigned a cryptographic token, where the digital shoe and cryptographic token collectively may represent a "CryptoKick" (CK). The digital representation may include a computer-generated avatar of the shoe or a limited-edition artist rendition of the shoe. The digital asset may be secured by an encryption-protected block that contains a transaction timestamp, transaction data, and a hash pointer as a link to a related block (e.g., genesis block or prior transacted block) in a decentralized blockchain. Using the digital asset, the buyer is enabled to securely trade or sell the tangible pair of shoes, trade or sell the digital shoe, store the digital shoe in a cryptocurrency wallet or other digital blockchain locker, intermingle or "breed" the digital shoe with another digital shoe to create "shoe offspring," and, based on rules of acceptable shoe manufacturability, have the newly bred shoe offspring custom made as a new, tangible pair of shoes.

Purchase of an authentic, tangible pair of shoes may enable or "unlock" a corresponding cryptographic digital asset and a digital shoe associated with that digital asset. For example, when a person purchases a real-world pair of shoes from a registered seller, a unique (e.g., 10-bit numeric) physical shoe identification (ID) code of the physical shoes may be linked to a unique (e.g., 42-bit alphanumeric) owner ID code of the buyer. Concomitantly, an access prompt with a unique (e.g., 64-bit numeric) key is issued to a cryptocurrency wallet account associated with the owner ID code such that the buyer can retrieve a digital shoe with a cryptographic token; the key, token, and digital shoe are assigned to the owner ID code. For instance, a first Ethereum Request for Comments (ERC) 721 or ERC1155 token may be granted to authenticate and transact a physical shoe, and a second ERC721/ERC1155 token may be granted to access, breed, and transact a digital shoe. For at least some implementations, real-world environmental effects, such as specific types of usage of the physical shoes, may impact the digital representation of the shoes. Respective cryptographic tokens may be assigned to the physical shoes and to the cryptographic digital asset; alternatively, a single cryptographic token may be assigned to both the physical shoes and the digital asset.

A digital asset, in at least some applications, may include genotype information and/or phenotype information for a digital shoe. This genotype/phenotype data may represent certain traits, attributes, colors, styles, backgrounds, etc., of the digital asset, and may be coordinated according to "breeding rules" that govern any intermingling of a digital shoe with one or more other discrete digital shoes. Phenotypic characteristics may depend on genotypic information, and vice versa, along with any one or more of: a virtual environment and attendant effects; time-dependent intermingling restrictions (e.g., cannot breed virtual shoe offspring until both reach a pre-established maturity); virtual user interactions that alter (e.g., speed up or slow down) maturity or increase/decrease a likelihood of certain traits developing; real-world interactions of a user (e.g., running increases number of good/desirable qualities, increases speed of maturity of virtual offspring, etc.); shoe cloning and allowing an owner to set a total number of clones that can be produced from a desirable offspring for actual real-world production, etc. Some optional features may also include: surrogacy features for breeding plans between two or more discrete digital shoes; parenting/nannying features provided by a third-party entity that does not own the digital shoe; behavioral and animated features designed to make a digital shoe appear more life-like (e.g., personalities that change over time); "breeding rights" for a digital shoe may be governed by one or more real-world manufacturing restrictions; ownership rights for each successive generation of a digital shoe may be tied back to the original, real-world shoe (e.g., wholly or partially; by percentage of genotypic contribution, etc.) via encryption key to the originally associated virtual product, etc.

Aspects of this disclosure are directed to methods for provisioning, intermingling, and/or exchanging cryptographic digital assets for footwear. In an example, a method is presented for automating generation of cryptographic digital assets associated with articles of footwear. This representative method includes, in any order and in any combination with any of the above or below disclosed features and options: receiving, via a server-class (middleware or backend) computer over a distributed computing network from a remote computing node (e.g., a point-of-sale (POS) terminal, a personal computer, a smartphone, etc.), a transaction confirmation indicative of a validated transfer of authentic footwear from a first party to a second party; determining, via the middleware server computer from an encrypted relational database, a unique owner ID code (e.g., a member ID of a cryptocurrency wallet or digital locker) associated with the second party; generating a cryptographic digital asset associated with the article of footwear, the cryptographic digital asset including a digital shoe (e.g., a computer-generated avatar) and a unique digital shoe ID code (e.g., a key and cryptographic token); linking, via the middleware server computer, the cryptographic digital asset with the unique owner ID code; and transmitting, via the middleware server computer to a distributed blockchain ledger (e.g., Bitcoin, Ethereum, Litecoin, etc.), the unique digital shoe ID code and the unique owner ID code for recordation on a transaction block.

Other aspects of this disclosure are directed to decentralized computing systems with attendant blockchain control logic for mining, intermingling, and exchanging blockchain-enabled digital shoes. As an example, a decentralized computing system is presented for automating generation of cryptographic digital assets associated with articles of footwear. The decentralized computing system includes a wireless communications device that connects with one or more remote computing nodes over a distributed computing network, and a cryptographic digital asset registry that stores digital shoes and unique digital shoe ID codes associated with multiple cryptographic digital assets. Other peripheral hardware may include a network interface bus, resident and/or remote memory, a user location tracking device, a UPC/UPID scanner, etc.

Continuing with the above example, the decentralized computing system also includes a server-class (middleware or backend) computer that is operatively connected to the wireless communications device and cryptographic digital asset registry. The middleware server computer is programmed to execute memory-stored firmware and software to receive, over the distributed computing network from a remote computing node, an electronic transaction confirmation indicative of a validated transfer of authenticated footwear from one party to another party. Responsive to receipt of the transaction confirmation, the server-class computer retrieves a unique owner ID code of the transferee party from an encrypted relational database, and generates a cryptographic digital asset associated with the article of footwear. The cryptographic digital asset includes a computer-generated digital shoe provisioned through a unique tokenized code with a corresponding access key. The server-class computer then links the cryptographic digital asset to the unique owner ID code in the cryptographic digital asset registry, and transmits the unique digital shoe ID code and unique owner ID code to a distributed blockchain ledger for recordation on a transaction block.

Further aspects of this disclosure are directed to methods for provisioning cryptographic digital assets associated with retail product transfers, such as a randomized lottery for purchase of a limited release athletic shoe via a dedicated mobile (SNKRS®) app. This representative method includes, in any order and in any combination with any of the above or below disclosed features and options: broadcasting, via a server computer over a distributed computing network, an electronic notification of a future transaction for a retail product; receiving, via the server computer over the distributed computing network from personal computing devices of multiple users, requests to participate in the future transaction; adding a select number of the users to a virtual line associated with the future transaction of the retail product; determining, via the server computer from the users added to the virtual line, a first user selected to receive the retail product and a second user selected to receive a cryptographic digital asset containing a digital retail product and a unique digital asset code; requesting, via the server computer, transfer of the cryptographic digital asset to a digital wallet of the second user; and transmitting the unique digital asset code to a distributed blockchain ledger to record on a distinct record block the transfer of the cryptographic digital asset to the second user.

Additional aspects of this disclosure are directed to a computing system for provisioning cryptographic digital assets associated with retail products transfers. The computing system includes a wireless communications that connects to a distributed computing network, a data storage device that stores user data in a virtual line associated with future retail product transactions, and a server computer communicatively connected to the wireless communications device and data storage device. The server computer is programmed to broadcast an electronic notification of a future transaction for a retail product, and thereafter receive user requests to participate in the future transaction. A select number of the users are added to the virtual line associated with the future retail product transaction; from those users added to the virtual line, a first user is selected to receive the retail product and a second user is selected to receive a cryptographic digital asset containing a digital retail product and a unique digital asset code. The cryptographic digital asset is transferred to a digital wallet of the second user, and the unique digital asset code is transmitted to a distributed blockchain ledger and recorded on a distinct record block to confirm the transfer of the cryptographic digital asset.

Aspects of this disclosure are also directed to a non-transitory, computer-readable medium (CRM) that stores instructions executable by one or more processors of one or more computing devices of a decentralized computing system. The CRM instructions, when executed, cause the computer device(s) to perform operations, including broadcasting, over a distributed computing network, an electronic notification of a future transaction for a retail product; receiving, over the distributed computing network from personal computing devices of multiple users, requests to participate in the future transaction; adding a select number of the users to a virtual line associated with the future transaction of the retail product; determining, from the users added to the virtual line, a first user selected to receive the retail product and a second user selected to receive a cryptographic digital asset containing a digital retail product and a unique digital asset code; requesting transfer of the cryptographic digital asset to a digital wallet of the second user; and transmitting the unique digital asset code to a distributed blockchain ledger to record on a distinct record block the transfer of the cryptographic digital asset to the second user.

For any of the disclosed systems, methods, digital assets, and retail products, the unique digital shoe ID code may include a cryptographic token key with a code string that is segmented into a series of code subsets. A first of these code subsets may include data indicative of attributes of the digital shoe. This attribute data may include genotype and phenotype data for the digital shoe. A second of these code subsets may include data indicative of attributes of the real-world article of footwear, such as colorway, materials, manufacturing, make, sustainability/eco-responsibility, and/or model data, etc., for the article of footwear.

For any of the disclosed systems, methods, digital assets and footwear, the server-class decentralized system computer may respond to receiving a transaction confirmation by transmitting an electronic notification to the second party with information for accessing the cryptographic digital asset. The server-class computer may subsequently receive, e.g., from a handheld personal computing device of the second party, a scanning confirmation verifying a universal product code (UPC) and/or a unique product identifier number (UPIN) corresponding to a make and a model of the footwear has been scanned. Linking the cryptographic digital asset with the unique owner ID code may be executed responsive to receipt of the scanning confirmation. In at least some applications, the unique digital shoe ID code may include a cryptographic token, and the digital notification sent to the second party may include a unique key with a hashed address to the cryptographic token.

For any of the disclosed systems, methods, digital assets, and retail products, the server-class computer may receive (from either participating party) a digital breeding solicitation with a request to intermingle the cryptographic digital asset with a third-party cryptographic digital asset. Upon receipt of this solicitation, the server-class computer may responsively generate a progeny cryptographic digital asset with a combination of one or more features from the second-party cryptographic digital asset and one or more features from the third-party cryptographic digital asset. For instance, each cryptographic digital asset may be assigned a respective unique cryptographic token key with a code string that is segmented into a series of code subset. One or more of these code subsets may include data indicative of attributes of the corresponding digital shoe.

For any of the disclosed systems, methods, digital assets, and retail products, the progeny cryptographic digital asset is provisioned via a distinct cryptographic token key with a code string composed of one or more code subsets with attribute data extracted from the cryptographic token key of the second-party digital asset and one or more code subsets with attribute data extracted from the cryptographic token key of the third-party digital asset. For instance, one code subset of the progeny digital asset may share a distinct alphanumeric sequence with a code subset of the second-party digital asset, while another code subset of the progeny digital asset may share a distinct alphanumeric sequence with a code subset of the third-party digital asset. Generating the progeny cryptographic digital asset may include applying a random number generator to: designate one of the mating cryptographic digital assets as a sire, designate the other cryptographic digital assets as a dam, and determine which code subsets of the progeny will correspond to which code subsets of the sire and which code subsets of the dam.

For any of the disclosed systems, methods, digital assets, and retail products, the server-class computer may receive a digital transfer proposal (from either the transferor or the transferee) with a request to transfer the cryptographic digital asset to a third party. The server-class computer may respond by determining a new unique owner ID code of the third party, link the cryptographic digital asset with this new unique owner ID code, and record the transfer of the unique digital shoe ID code to the new unique owner ID code on a new transaction block with the distributed blockchain ledger. The digital transfer proposal may be transmitted in response to a confirmation indicative of a new validated transfer of the article of footwear from the second party to the third party. Alternatively, transfer of the cryptographic digital asset to a third party may be independent of transfer of the physical footwear. Optionally, the server-class computer may generate a smart contract that authenticates ownership of and/or tracks future transaction of the cryptographic digital asset. The unique owner ID code may be linked with a cryptocurrency wallet that registered with the distributed blockchain ledger.

For any of the disclosed systems, methods, digital assets, and retail products, a unique digital asset code may include a cryptographic token with a code string segmented into at least a private key and a public key. As a further option, a retail product transaction includes impending transactions of multiple retail products; in this instance, a first subset of the users added to the virtual line are each selected to receive one of the retail products. In the same vein, the cryptographic digital asset may include multiple cryptographic digital assets; in this instance, a second subset of the users added to the virtual line, which were not selected to receive a retail product, is each selected to receive one of the cryptographic digital assets.

For any of the disclosed systems, methods, digital assets, and retail products, the cryptographic digital assets include multiple asset sets each containing a distinct type of cryptographic digital asset. In this instance, the second subset of users includes multiple subset groups with users each selected to receive the corresponding type of cryptographic digital assets from that asset set. Optionally, the first asset set includes a distinct number of the first type of cryptographic digital assets, and the second asset set includes a distinct number of the second type of cryptographic digital assets. The second asset set may include a fraction (e.g., ~1-2%) of the number of assets contained in the first asset set.

For any of the disclosed systems, methods, digital assets, and retail products, each transfer of a cryptographic digital asset to a digital wallet of a user may be accompanied by an electronic message to the user with a unique key and a hashed address to a cryptographic token. As yet a further option, the electronic notification of the retail product transaction is broadcast during a previously announced time period and at a random or preset time within the time period that is unknown to the users from which the requests are received. The server computer may receive, from the personal computing device of a user, data indicating that the user completed a predefined activity; in response, the user is advanced to an improved position forward in the virtual line based on the received activity data. The number of users added to a virtual line may be generated by a random number generator (RNG). Moreover, determining which users receive the retail products and cryptographic digital asset includes selecting the each user from preset positions in the virtual line (e.g., first 100 users selected to receive retail product, second 100 users selected to receive cryptographic digital asset).

For any of the disclosed systems, methods, digital assets, and retail products, a distinct cryptographic digital asset may be generated for each retail product. For each user selected to receive a retail product, the system tracks a time of custody between the transfer of the product's cryptographic digital asset to a first digital wallet of a first user and a subsequent transfer of the product's cryptographic digital asset to a third-party digital wallet of a third user. It is then determined if the time of custody is below a predefined minimum hold time for that cryptographic digital asset; if so, a scalping notification stored in cache memory and/or is output to the manufacturer of the product. A smart contract may be generated to authenticate ownership of, and to track future transaction of, the cryptographic digital asset associated with the retail product. A cryptographic digital asset may include genotype data representative of an appearance trait of a digital retail product, such as a digital shoe or a digital article of apparel. As a further option, each received request to participate in the future retail product transaction may include a quick reference (QR) code acquired by the user from, for example, a ticket to an event at a designated venue, a tangible object within the designated venue, or a merchandise receipt generated within the designated venue.

The above summary does not represent every embodiment and every aspect of this disclosure. Rather, the foregoing summary merely provides an exemplification of some of the concepts and features set forth herein. The above features and advantages, and other features and attendant advantages of the disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the features presented above and below.

DETAILED DESCRIPTION

Figure 1:
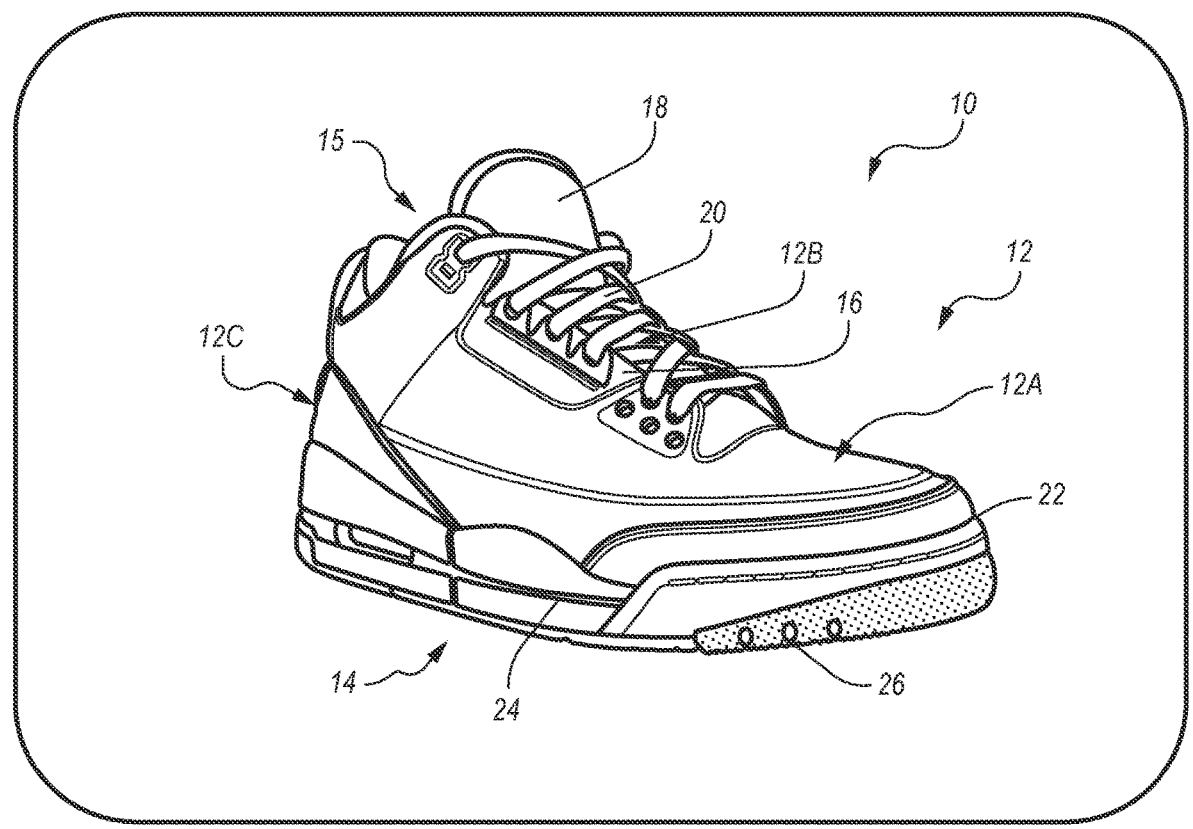
FIG. 1 is a lateral-side, perspective-view illustration of a representative article of footwear with a collectible digital asset protected by a cryptographic token that is secured by a blockchain ledger in accordance with aspects of the present disclosure.

This disclosure is susceptible of embodiment in many different forms. Representative examples of the disclosure are shown in the drawings and will be described in detail herein with the understanding that these representative examples are provided as an exemplification of the disclosed principles, not limitations of the broad aspects of the disclosure. To that extent, elements and limitations that are described in the Abstract, Technical Field, Background, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "comprising," "having," "containing," and the like shall each mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, medial, lateral, proximal, distal, vertical, horizontal, front, back, left, right, etc., may be with respect to an article of footwear when worn on a user's foot and operatively oriented with a ground-engaging portion of the sole structure seated on a flat surface, for example.

Aspects of this disclosure are directed to computer-generated digital/virtual collectibles, such as digital shoes (e.g., "CryptoKicks" or "CK"), that, in some instances, the digital asset may be secured and/or uniquely identified by a cryptographic token and may be linked and/or distributed with real-world, physical products, such as tangible shoes. In other embodiments, instead of being linked or distributed with real-world, physical products, the digital asset may be linked or distributed with a 2D or 3D design file such as a CAD model, graphical rendering, image, or drawing package from which a physical product may be constructed or otherwise represented.

Various digital assets may be used by a company, for example, to stay apprised of consumer trends and preferences. For instance, a company may create a number of product-ready designs with different traits, silhouettes, colors, and the like, and may distribute them across one or more digital platforms as digital assets, and may then monitor the popularity, value, demand, and/or virtual use, of different product designs and/or traits. In doing so, the company may gain a valuable understanding of the real-time demand for a product, which may be helpful when prioritizing of designs for future manufacturing.

A digital asset or attribute modifier may be created, for example, for brand promotion purposes. For instance, a digital shoe may be created in a preset and/or controlled limited quantity and distributed as part of a promotion, event, moment, or contest. Spectators at a professional sporting event (e.g., a home opener) may be given the right to acquire one of a limited quantity of unique digital assets, each being separately secured via its own cryptographic token.

As used herein, "cryptographic digital assets," or simply "digital assets" may refer to any computer-generated virtual object, including digital footwear, apparel, headgear, avatars, pets, etc., that have a unique, non-fungible tokenized code ("token") registered on and validated by a blockchain platform or otherwise registered in an immutable database. Furthermore all references to "CryptoKicks" and variations of the term within this disclosure should be understood to be exemplary of a virtual collectible backed by a unique, non-fungible token or registry entry within an immutable database. It should not be limiting to only footwear. All such references should be read to equally apply to apparel (e.g., "CryptoThreads"), headgear (e.g., "CryptoLids"), and sporting equipment (e.g., "CryptoGear"), or other such objects.

A virtual object may have multiple attributes (i.e., phenotypic traits) that are at least partially derived from an encrypted alphanumeric string that may be associated with the cryptographic token. In this sense, the alphanumeric string may be akin to the genetic code of the virtual object. (i.e., genotypic information is the underlying code/code segments while phenotypic traits are the expression of the genotypic information). While the phenotypic traits may depend on the encoded genotypic information, they may optionally depend on any one or more of: a virtual environment (e.g., virtual check-ins, situation-specific criterion, etc.); time-dependent breeding (e.g., a user is restricted from breeding a virtual shoe offspring until it reaches a preset maturity); virtual user interactions, which may speed up or slow down maturity or increase/decrease a likelihood of certain traits developing; real-world user activities (e.g., user's level of physical activity may increase one or more "desirable" qualities; daily use of a related good speeds up maturing of virtual offspring, etc.); cloning restrictions set by manufacturer, point of sale, owner, etc., (e.g., preset maximum number of clones that can be produced from a desirable offspring for actual real-world production).

In a footwear context, each unique token may be directly linked to a single CryptoKick object, which may be embodied as a virtual reproduction or digital-art version of a sneaker. In an example, the token may include a 64-bit alphanumeric code that is sectioned into individual code segments. One or more or all of the code segments of the alphanumeric code may express data indicative of attributes of the collectible digital shoe. For instance, a series of code segments may provide digital shoe attributes, such as Style, Materials, Family, Heat, Colorway, Future Attributes, Make, Model, Pattern Scheme, Image Background, etc. Each subset of a code may generally function as a genotype that produces a visual phenotype expression to the user. An originally created CryptoKick may include cryptographic token data that is representative of attributes from a companion physical shoe. During the creation of a CryptoKick, a smart contract may be generated to authenticate ownership and to track future transaction of the CryptoKick. Digital shoe attributes may also be linked to a bill of materials.

In a representative example, an authenticated pair of physical shoes are created and assigned a Unique Product Identifier (UPID). Upon purchase by a consumer, the UPID is used to unlock a cryptographic digital asset—a "Crypto-Kick"—composed of a collectible digital shoe and a unique non-fungible token (NFT) operating on a blockchain-based distributed computing platform.

In general, before a consumer can unlock or acquire a CryptoKick, they may first be required to procure a blockchain locker address (e.g., an Ethereum hardware wallet). This blockchain locker may be used to store the private key belonging to the CryptoKick's NFT and, optionally, may be linked to a personal user account that is registered with the original manufacturer of the physical shoes (e.g., a NIKE-PLUS® account profile).

It is envisioned that there are several ways in which a user may be enabled to unlock a CryptoKick. As a first example, upon scanning the shoe's UPC or UPID at a point-of-sale (POS) terminal during first purchase or directly associated with the product, a unique crypto-token and corresponding private key ("KickID") are automatically generated and assigned to the user's blockchain locker (see FIG. 7). In a second example, a KickID is provided to the user via a printed or digital receipt, a visual or electronic tag (RFID or NFC) hidden in the physical shoe, a pop-up message or email sent to a personal user account, a push notification or text message sent to a smartphone, or some other record; the consumer uses the KickID to link the CryptoKick to their digital blockchain locker. Another example may require the user to assemble the KickID in part via a physical code or UPID associated with the shoe (on the box, on a hang tag, under a label, on an insole, etc.), and in part via a transaction authentication code (i.e., to prevent consumers from collecting a CryptoKick when they merely try on a pair of shoes). Another example may require the user to "hunt" for CryptoKicks in a brick-and-mortar store by using a photographic "snap" or augmented reality ("AR") function on a handheld personal computing device. For this method, a KickID may be provided via the validated transaction, however, the user must separately find a hidden CryptoKick in AR hidden within the store or local area before the digital asset can be transferred to their locker (i.e., the cryptographic key and the virtual object must both be separately acquired before the transfer occurs). In this example, obtaining the cryptographic key may enable the AR engine associated with a user device to initiate a game where the CryptoKick/virtual object associated with that key is locally hidden and available for the user to locate.

Figure 8:
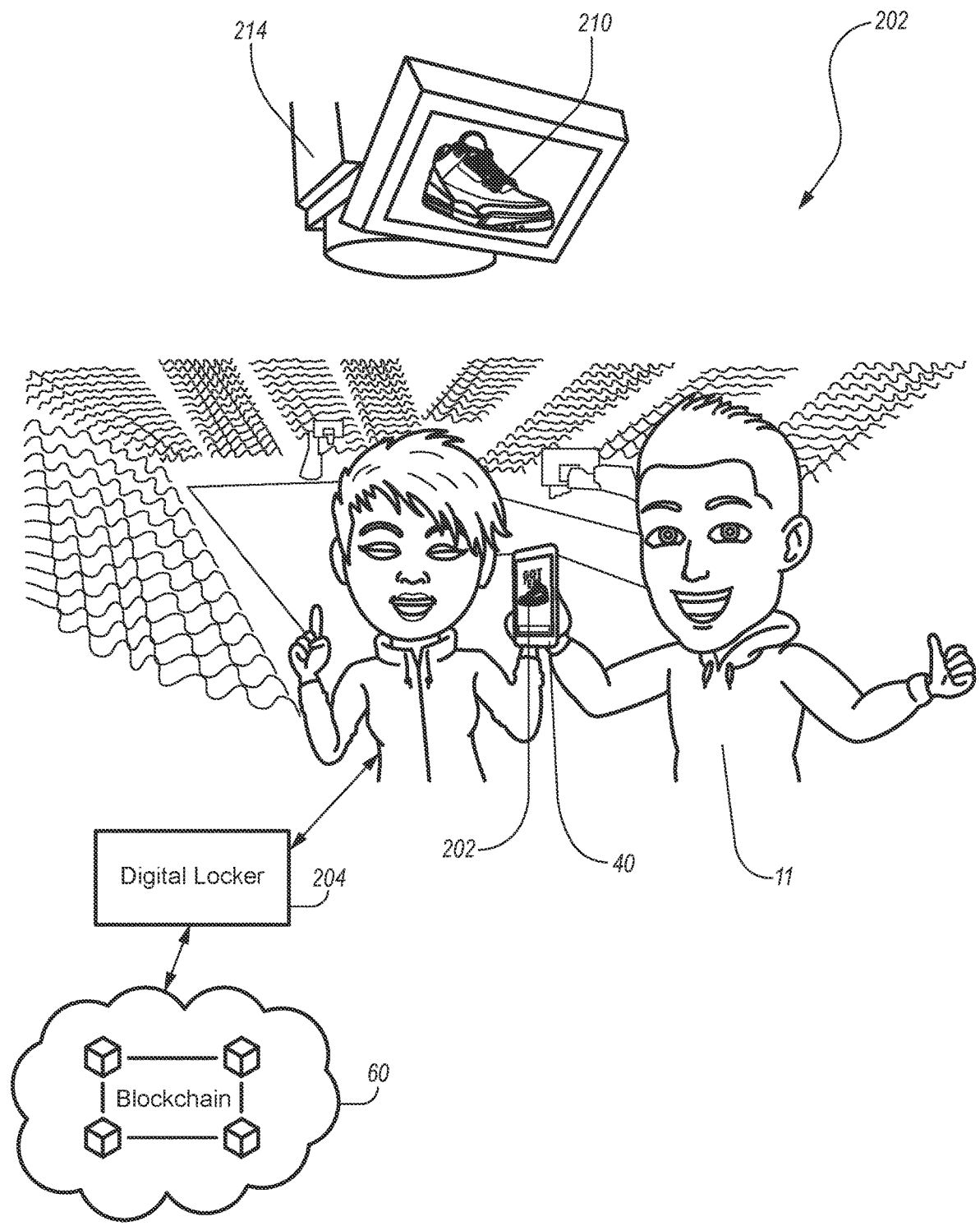
FIG. 8 is a functional illustration of the acquisition of a cryptographic digital asset via a promotional giveaway at an event.

In some instances, the CryptoKick may not be originally linked to a physical product, but instead may be gifted to the user as part of a brand promotion campaign, event, moment, or experience. In one example, such as generally illustrated in FIG. 8, a user at a sporting event may be prompted to hunt for the CryptoKick within the confines of the event using a digital camera on a smartphone device. In this example, the GPS associated with the smartphone device may further constrain optical recognition capabilities to within a particular geofenced area. Once the CryptoKick is located (e.g., virtually disguised in a billboard advertisement), the user may be prompted to scan a unique code, such as the barcode on their ticket to the event. This two-part action may then transfer a token uniquely provisioned for that ticket to the user's locker.

Following the event, the promotion organizer may reclaim any unclaimed KickIDs for subsequent use in other promotional events. In still other applications, a user may unlock a KickID upon the receipt of a digital design file or image. For example, in an online promotion, certain users may be selected (in an ordered or random manner) to receive an image, design file, or graphical rendering. A predetermined number of "winning images" may be displayed and/or transferred to a user's computing device for subsequent display, where each is associated with a different and unique KickID that may be used to facilitate the transfer of the CryptoKick to a private locked associated with the user. A "winning image" may represent, for example, the purchase or successful agreement to purchase a particular physical or digital object. In other embodiments, the "winning image" may simply be a hidden or masked imaged within an online brand promotion page that requires user interaction to unmask.

After acquiring a CryptoKick, the owner may buy, sell, intermingle, collect, or trade CryptoKicks, e.g., using physical, fiat, and/or digital currency. In some examples, an entity may maintain a digital online marketplace that includes an inventory of CryptoKicks for sale and/or a marketplace that may broker transactions between individuals.

It may also be possible to breed or mashup ("Collab") two CryptoKicks to create an offspring CryptoKick (an "RVK" or "CollaboKick"). This CollaboKick will have a unique token and distinct attributes compared to the parent CryptoKicks. A Collab may combine attribute data and/or genetic code from the two tokens of the parents to generate a new NFT or KickID that, in turn, provisions a CollaboKick. In some implementations, there may be a pre-established limitation on the total number of Collab events within a given time limit, e.g., to help prevent overproduction of CollaboKicks between the same two users. The creation of the genetic code for a CollaboKick may be random, systematic, regulated, unconstrained, or any combination thereof. One or more code subsets, for example, may be based on controlled probability using Mendel's Law. For example, if a first attribute code (e.g., molding heat) is expressed as two genes (e.g., HH, Hh or hh), a CollaboKick is considered to have "high heat" if it has two genes that are "hh" (recessive trait). In other words, if genotype data contained in the KickIDs of the CryptoKick parents have Hh as their "heat genes," the offspring CollaboKick will have a 25% of getting a high heat gene, e.g., using the Punnett square methodology.

The option to execute a Collab event may require one or both owners comply with one or more prerequisite conditions. As one example, the two owners of the parent CryptoKicks may be required to meet at a designated location or be within a predetermined proximity of one another to create a CollaboKick. For example, a user may employ a "CryptoKick Collab" matching feature on a dedicated mobile software application ("app") to find another user to Collab with. Using this app, the parties may set a time and place to meet, set the conditions of the Collab, submit a formal request to a governing middleware computing node, etc. Another example may include the footwear manufacturer or a third-party sponsor host a Collab event at which CryptoKick owners meet at a designated location to Collab with one another within a specific time frame.

Owners may be provided some indication of the genetic traits of their CryptoKicks to facilitate more deliberate Collab events. In an example, a user may desire a CryptoKick of a particular model in a certain exclusive color. That user may then search out a CryptoKick that has the genetic code for that color and attempt to Collab with them. To further the understanding of a trait's value, for example, the user may be provided with an indication of the rarity or total circulating supply of each trait that makes up their CryptoKick and/or a rarity score that provides an indication of the overall exclusivity of their CryptoKick. In this manner, if offered for sale on a commercial marketplace, a CryptoKick may carry an intrinsic value that reflects the combined rarity or exclusivity of its various traits.

A predetermined set of intermingling rules may govern if and how a Collab may be executed. For example, certain constraints may be imposed so that broad style guidelines are maintained in the CollaboKick. In an example, these style constrains may be the same constraints or guidelines that a company may use when creating new versions, colorways, or iterations of an existing product line. When a Collab is created, the genetic mixing algorithm may be constrained such that any resultant Collab kick maintains a likeness or silhouette that is indicative of or more existing products. While in an example, these style guidelines or rules may expressly set by the company, in another embodiment, they may be discovered and assembled, for example, using an image-based processing algorithm that may recognize style attributes (e.g., color patterns, material, cut, and/or dimensional patterns) from existing product.

For at least some implementations, a CryptoKick may be programmed to function as a "living" digital pet that the user feeds, cleans, entertains and otherwise cares for to ensure the pet is happy and healthy. Optionally, an owner can either care for the CryptoKick pet by him/herself or have a third-party user care for the CryptoKick pet. As the CryptoKick pet evolves—growing from a baby digital pet to a toddler, then preschooler, and so forth to adulthood—one or more attributes of the CryptoKick automatically change with age or are unlocked over time. Furthermore, as the CryptoKick pet "grows" through various life stages, it may unlock a real-life shoe version of itself that a user can have made. For example, if a CryptoKick pet has evolved into a royal blue athletic shoe for a toddler, the user has unlocked the option to buy a special royal blue athletic shoe in one or more toddler sizes.

In some implementations, a user's CryptoKick may be capable of being imported into one or more other digital platforms to serve, for example, as a skin on a video game character that may be developed and/or controlled by the user. For example, if the user was active in a certain basketball video game, the CryptoKick could be imported to that game and worn by the user's player or team.

If the CryptoKick is imported into a separate video game, in some configurations, different attributes of the CryptoKick may impart changes in the ability level of a user's character outfitted with the asset. In one example, the attributes of the user's character may be positively influenced by the rarity or exclusivity of the various attributes or by the overall combined rarity or exclusivity of the asset. For example, a rare CryptoKick may impart better jumping ability or lateral quickness, a rare CryptoThread may impart better strength or speed, and a rare CryptoLid may impart better vision.

CryptoKicks users may optionally decide on a "best CollaboKick" in the marketplace, e.g., on a W/M/Q/Y basis. Such a voting scheme may be used to designate one or more CollaboKicks as suitable for the commercial production of physical product bearing that digital asset's likeness. As a further option, a CollaboKick that may receive a preset threshold number of "upvotes" that may automatically trigger the manufacturer to produce the CollaboKick in real life.

As CryptoKicks and CollaboKicks are transferred between users over time due to selling, trading, buying, and Collab, each transaction history may be tracked within a blockchain ledger of transactions. If a CollaboKick or CryptoKick is fabricated, previous users may be notified of such real-life existence and will may be given an option to purchase their own real-life pair of the CollaboKick/CryptoKick.

As a further extension, in an example, CryptoKicks may be backed by fungible tokens, where the digital collectible represents a monetary value. In one implementation, certain attributes within the code assigned to the token may dictate the worth. For example, a style attribute indicative of a high-top sneaker, may have a first value, a style attribute indicative of yoga pants may have a second value, and a style attribute indicative of a running shirt may have a third value. In an example, these values may either be allowed to float according to market forces, or may be tied to a fiat currency.

Referring now to the drawings, wherein like reference numbers refer to like features throughout the several views, there is shown in FIG. 1 a representative article of footwear, which is designated generally at 10 and portrayed herein for purposes of discussion as an athletic shoe or "sneaker." The illustrated article of footwear 10—also referred to herein as "footwear" or "shoe" for brevity—is merely an exemplary application with which novel aspects and features of this disclosure may be practiced. In an example, the illustrated article of footwear 10 may be or resemble a CryptoKick. In the same vein, implementation of the present concepts for a digital shoe and cryptographic token for footwear should also be appreciated as a representative implementation of the disclosed concepts. It will therefore be understood that aspects and features of this disclosure may be utilized for other types of footwear, and may be incorporated into any logically relevant consumer product. As used herein, the terms "shoe" and "footwear," including permutations thereof, may be used interchangeably and synonymously to reference any suitable type of garment worn on a human foot. Lastly, features presented in the drawings are not necessarily to scale and are provided purely for instructional purposes. Thus, the specific and relative dimensions shown in the drawings are not to be construed as limiting.

The representative article of footwear 10 is generally depicted in FIG. 1 as a bipartite construction that is primarily composed of a foot-receiving upper 12 mounted on top of a subjacent sole structure 14. While only a single shoe 10 for a left foot of a user is shown in FIG. 1, a mirrored, substantially identical counterpart for a right foot of a user may be provided. Recognizably, the shape, size, material composition, and method of manufacture of the shoe 10 may be varied, singly or collectively, to accommodate practically any conventional or nonconventional footwear application.

With continued reference to FIG. 1, the upper 12 is depicted as having a shell-like, closed toe and heel configuration for encasing a human foot. Upper 12 of FIG. 1 is generally defined by three adjoining sections, namely a toe box 12A, a vamp 12B and a rear quarter 12C. The toe box 12A is shown as a rounded forward tip of the upper 12 that extends from distal to proximal phalanges to cover and protect the user's toes. By comparison, the vamp 12B is an arched midsection of the upper 12 that is located aft of the toe box 12A and extends from the metatarsals to the cuboid. As shown, the vamp 12B also provides a series of lace eyelets 16 and a shoe tongue 18. Positioned aft of the vamp 12B is a rear quarter 12C that extends from the transverse tarsal joint to the calcaneus bone, and includes the rear portions of the upper 12. While portrayed in the drawings as comprising three primary segments, the upper 12 may be fabricated as a single-piece construction or may be composed of any number of segments, including a toe cap, heel cap, ankle cuff, interior liner, etc. For sandal and slipper applications, the upper 12 may take on an open toe or open heel configuration, or may be replaced with a single strap or multiple interconnected straps.

The upper 12 portion of the footwear 10 may be fabricated from any one or combination of a variety of materials, such as textiles, engineered foams, polymers, natural and synthetic leathers, etc. Individual segments of the upper 12, once cut to shape and size, may be stitched, adhesively bonded, fastened, welded or otherwise joined together to form an interior void for comfortably receiving a foot. The individual material elements of the upper 12 may be selected and located with respect to the footwear 10 in order to impart desired properties of durability, air-permeability, wear-resistance, flexibility, appearance, and comfort, for example. An ankle opening 15 in the rear quarter 12C of the upper 12 provides access to the interior of the shoe 10. A shoelace 20, strap, buckle, or other conventional mechanism may be utilized to modify the girth of the upper 12 to more securely retain the foot within the interior of the shoe 10 as well as to facilitate entry and removal of the foot from the upper 12. Shoelace 20 may be threaded through a series of eyelets 16 in or attached to the upper 12; the tongue 18 may extend between the lace 20 and the interior void of the upper 12.

Sole structure 14 is rigidly secured to the upper 12 such that the sole structure 14 extends between the upper 12 and a support surface upon which a user would stand. The sole structure 14 may be fabricated as a sandwich structure with a top-most insole 22, an intermediate midsole 24, and a bottom-most outsole 26 or outsole surface. Alternative sole configurations may be fabricated with greater or fewer than three layers. Insole 22 is shown located partially within the interior void of the footwear 10, operatively attached at a lower portion of the upper 12, such that the insole 22 abuts a plantar surface of the foot. Underneath the insole 22 is a midsole 24 that incorporates one or more materials or embedded elements that enhance the comfort, performance, and/or ground-reaction-force attenuation properties of footwear 10. These elements and materials may include, individually or in any combination, a polymer foam material, such as polyurethane or ethylene-vinyl acetate (EVA), filler materials, moderators, air-filled bladders, plates, lasting elements, or motion control members. Outsole 26 is located underneath the midsole 24, defining some or all of the bottom-most, ground-engaging portion of the footwear 10. The outsole 26 may be formed from a natural or synthetic rubber material that provides a durable and wear-resistant surface for contacting the ground. In addition, the outsole 26 may be contoured and textured to enhance the traction (i.e., friction) properties between footwear 10 and the underlying support surface.

As a general matter, each element, panel, section, and material of the article of footwear 10 shown in FIG. 1 may be separately rendered or defined in a digital CryptoKick. Furthermore, these attributes may similarly be reflected within the genetic code of the NFT, as discussed above.

Figure 2:
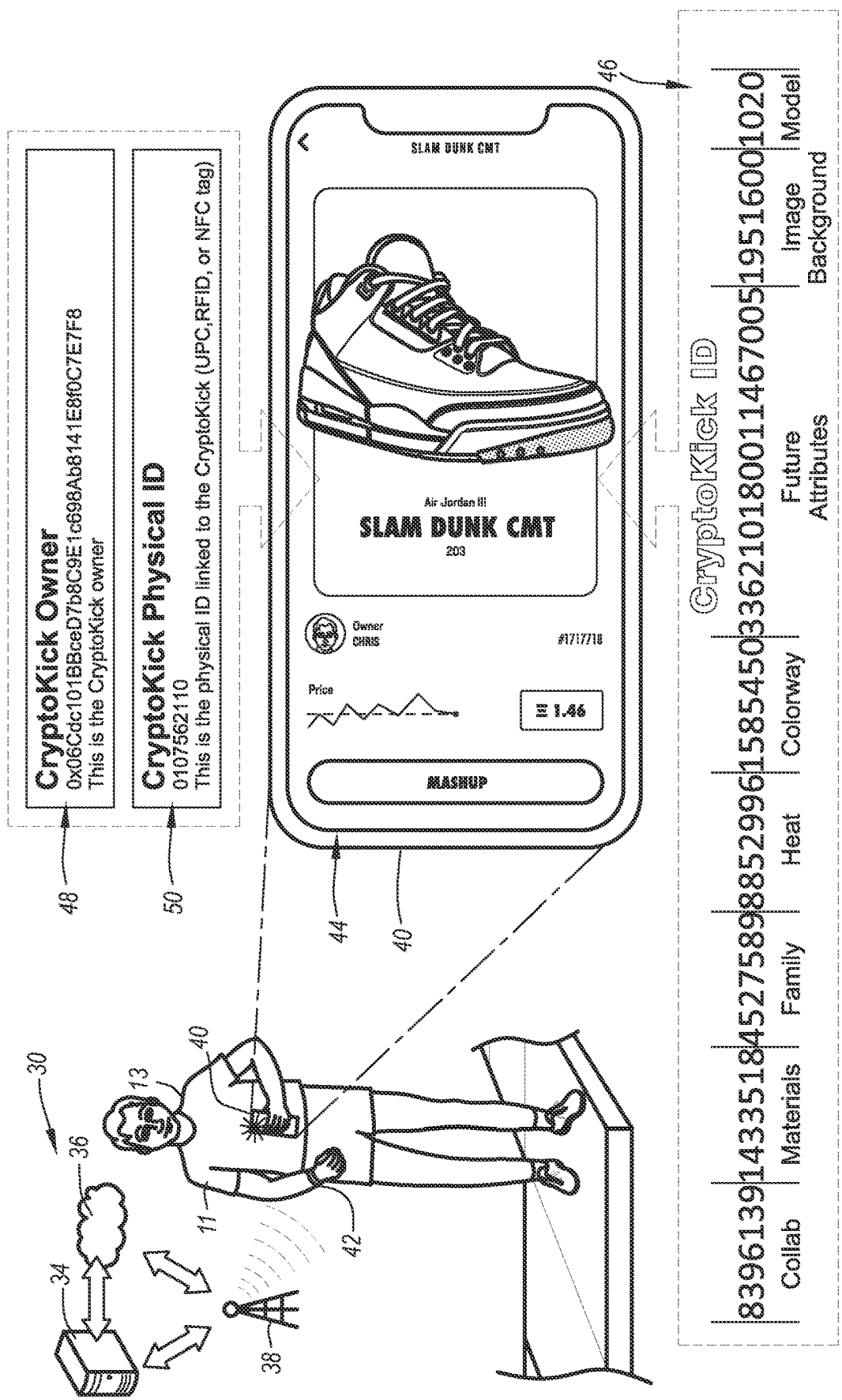
FIG. 2 is a diagrammatic illustration of a representative decentralized computing system for generating, intermingling, and exchanging cryptographic digital assets in accordance with aspects of the present disclosure.

FIG. 2 is a diagrammatic illustration of an exemplary decentralized computing system, designated generally as 30, with attendant blockchain control logic for mining, intermingling, and exchanging blockchain-enabled digital collectibles. User 11 communicatively couples to a remote host system 34 and/or a cloud computing system 36 via a wireless communications network 38. While illustrating a single user 11 communicating over the decentralized computing system 30 with a single host system 34 and a single cloud computing system 36, it is envisioned that any number of users may communicate with any number of remote computing nodes that are suitably equipped for wirelessly exchanging information and data. Wireless data exchanges between the user 11 and remote computing nodes on the decentralized computing system 30 may be conducted directly, e.g., through direct communications between the host system 34/cloud computing system 36 and a user device 39 (e.g., the user's smartphone 40, smartwatch 42, or other suitable personal computing device), or indirectly, e.g., with all communications between the user 11 and other computing nodes being routed through the host system 34.

Only select components of the decentralized computing 10 and decentralized computing system 30 are shown and will be described in detail herein. Nevertheless, the systems and devices discussed herein can include numerous additional and alternative features, and other available hardware and well-known peripheral components, for example, for carrying out the various methods and functions disclosed herein. While the described system relies on a blockchain ledger and process for recording ownership of the digital asset, it should be understood that the present technology may operate on a public chain or a private chain, and may utilize one or more forms of cryptography, encoding, proof of work challenges, or other concepts and technologies involved in available blockchain standards or suitable alternative immutable databases/ledgers.

With continuing reference to FIG. 2, the host system 34 may be implemented as a high-speed server computer or a mainframe computing device capable of handling bulk data processing, resource planning, and transaction processing. For instance, the host system 34 may operate as middleware in a client-server interface for conducting any necessary data exchanges and communications with one or more "third party" servers to complete a particular transaction. The cloud computing system 36, on the other hand, may operate as middleware for IoT (Internet of Things), WoT (Web of Things), Internet of Adaptive Apparel and Footwear (IoAAF), and/or M2M (machine-to-machine) services, connecting an assortment of heterogeneous electronic devices with a service-oriented architecture (SOA) via a data network. As an example, cloud computing system 36 may be implemented as a middleware node to provide different functions for dynamically onboarding heterogeneous devices, multiplexing data from each of these devices, and routing the data through reconfigurable processing logic for processing and transmission to one or more destination applications. Network 38 may be any available type of network, including a combination of public distributed computing networks (e.g., Internet) and secured private networks (e.g., local area network, wide area network, virtual private network). It may also include wireless and wireline transmission systems (e.g., satellite, cellular network, terrestrial networks, etc.). Most if not all data transaction functions carried out by the user 11 may be conducted, for example, over a wireless network, such as a wireless local area network (WLAN) or cellular data network.

As a decentralized blockchain platform, computing system 30 operates as an open, yet encrypted peer-to-peer network in which asset transaction records—known as "blocks"—are linked via cryptographic hash functions in a distributed, immutable ledger of interconnected blocks, i.e., a "blockchain." Each block in the chain includes one or more digital asset transactions accompanied by corroboration information representing a validity of each transaction as assessed by peer-validation devices. Encrypted, decentralized computing architectures allow for identity verification and authentication of transacted assets while preventing duplication of a cryptography-protected ("cryptographic") digital asset registered to the platform. Decentralized asset management may work by encrypting a proprietary asset file, breaking the encrypted code into tiny "nonsense" shards, and sending these shards to numerous different computing nodes on the decentralized computing network. A validated owner is provided with a private key that indicates where in the network the asset is located and how to reassemble or "decrypt" the file. For use as a distributed ledger, an individual blockchain is typically managed by a host administrator and distributed to multiple peers collectively adhering to a protocol for inter-node communication and block validation.

One should appreciate that the disclosed systems and techniques provide many advantageous technical effects including construction and storage of a digital asset blockchain representing user-to-user transactions of virtual collectibles. Further the blockchain technology enables the creation of unique, yet fully transferrable digital assets that maintain value by way of the general inability to make lossless copies (unlike traditional, unsecured digital files).

Figure 3:
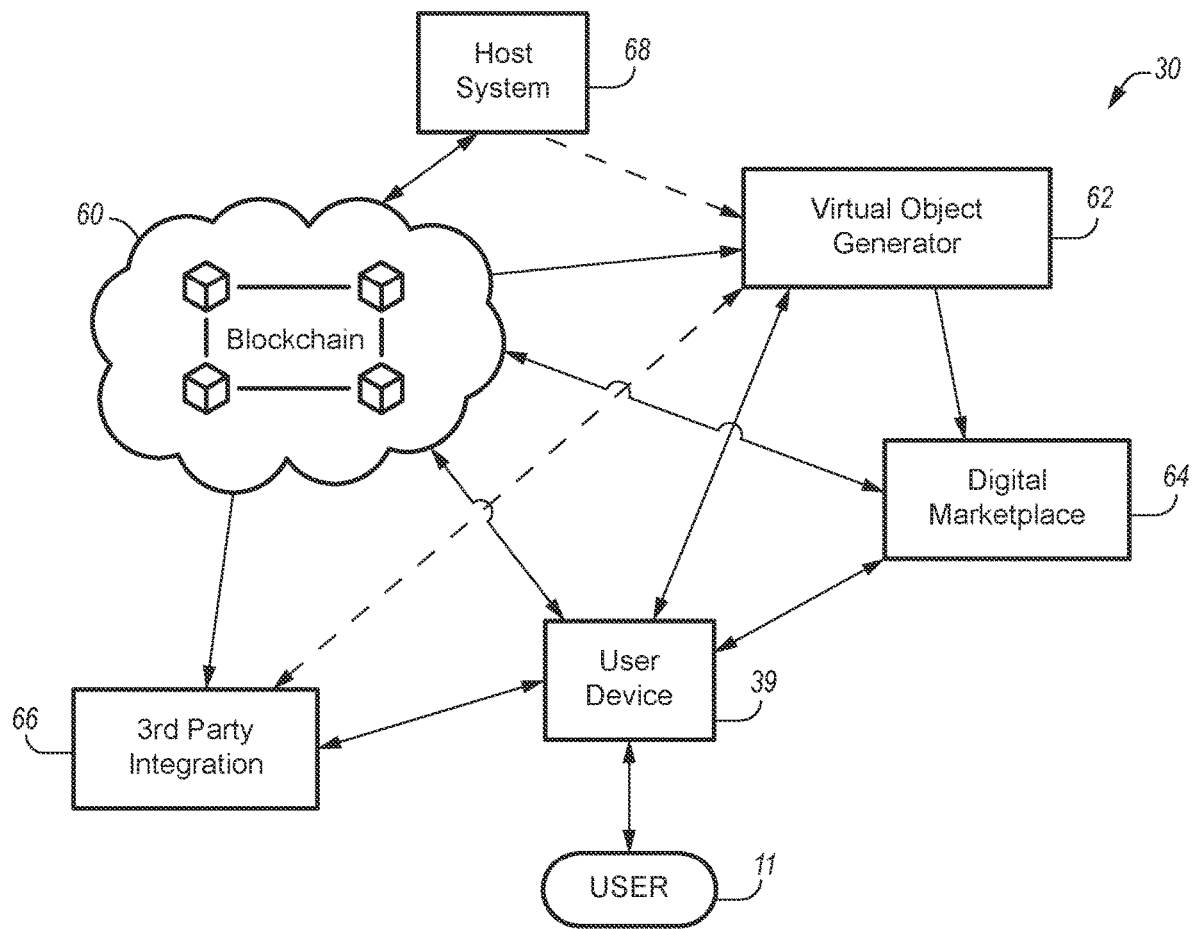
FIG. 3 is a diagrammatic illustration of the functional structure of a decentralized computing system for securing, intermingling, and exchanging cryptographic digital assets in accordance with aspects of the present disclosure.

FIG. 3 provides one example of the functional structure of a decentralized computing system 30, such as shown in FIG. 2. As generally illustrated, a user 11 may operatively interface with a user device 39 (i.e., interface device 39) that may include one or more of a smartphone 40, a tablet computer, a smart watch 42, a laptop computer, a desktop computer, a standalone video game console, smart footwear/apparel, or other similar internet enabled devices. The interface device 39 may be operatively configured to communicate with one or more of an immutable public database (e.g., a blockchain service/network 60—referred to as "blockchain 60"), a virtual object generator 62, an online digital marketplace 64, and/or a $3^{rd}$ party integration service 66.

In general, the blockchain 60 may include at least one non-fungible token registered thereon that includes genomic information representative of a digital asset. The user 11, via the user device 39, may be in possession of, or may be lined with a locker/wallet that includes a private encrypted key that permits the user device to read the encrypted data associated with the token. This key may further enable the user 11 to freely transfer ownership of the token.

In an example, a virtual object generator 62 may be provided to create a digital object on the basis of the genomic information associated with the token. More specifically, the virtual object generator 62 may be responsible for expressing the genomic information into a plurality of phenotypic traits. The virtual object generator 62 may employ a plurality of style and artistic rules such that the resultant digital objects are unique, yet recognizable according to predefined silhouettes, styles, articles, or characters. A virtual object generator 62 may optionally operate on the basis of other non-genomic factors, such as the age of the asset, user activity (tracked via the user device), or use via third party platforms. In such an embodiment, these non-genomic inputs may alter the phenotypic expression, and/or may unlock new abilities, breeding rights, and/or production rights. For example, in one configuration, a color of a CryptoKick may depend on the genetically assigned color, together with the age of the asset and/or use of the asset in a virtual world or via a linked pair of physical shoes in the real world. The initial color together with the age/experience based alteration may result in a new color that has its own relative rarity score/value.

Figure 5:
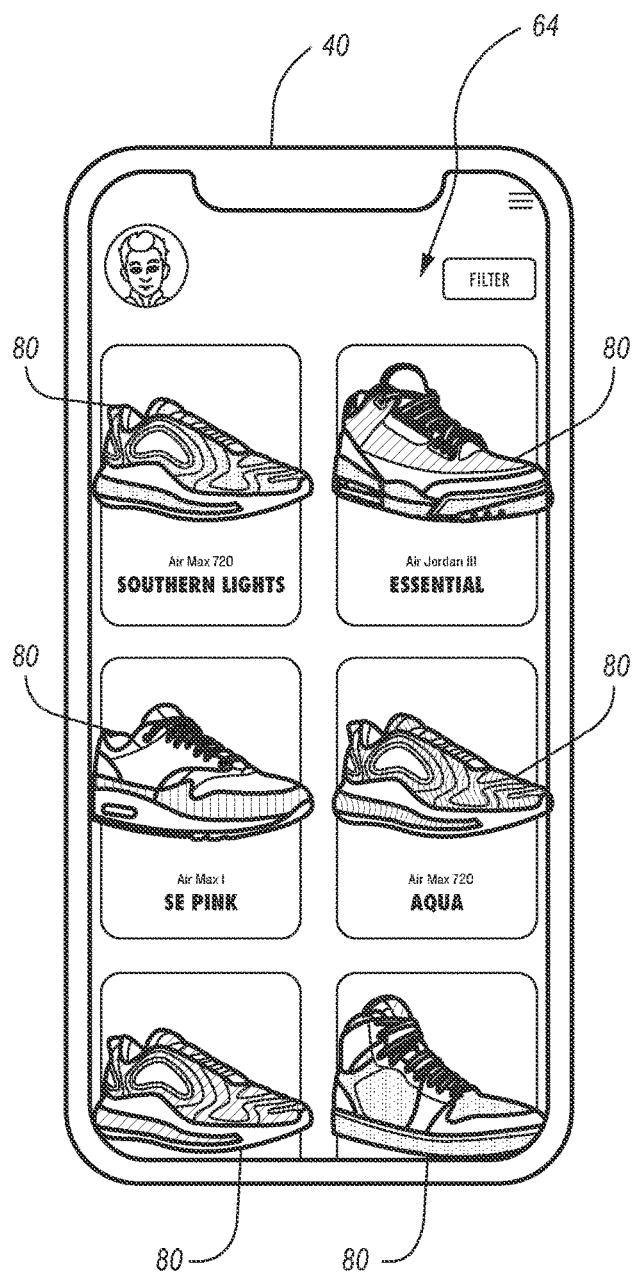
FIG. 5 is an illustration of a representative graphical user interface (GUI) of a personal computing device illustrating a library of cryptographic digital assets.

The virtual object generator 62 and/or blockchain 60 may further be in communication with a hosted digital marketplace 64, forum, social platform, or the like (such as generally shown in FIG. 5—displayed on a smartphone 40). The digital marketplace 64 may represent a plurality of virtual objects 80 in such a manner that permits the organized trade or sale/purchase of the virtual objects between parties. Upon the closing of a sale, the digital marketplace 64 may update the blockchain 60 with the new ownership information and facilitate the transfer of new of existing keys to the new asset holder. A marketplace 64 may further enable various social engagement functions, such as voting or commenting on the represented virtual objects. Likewise, in some instances the marketplace 64 may be configured to assess and score the rarity of a particular virtual object based on the sum total of the object's expressed traits. Such a rarity score may then enable the marketplace (and/or users who participate within the marketplace) to better assess the value of the object.

In one configuration, the computing system 30 may further include a $3^{rd}$ party integration service 66 that may enable the use of the virtual object in different contexts or manners. The $3^{rd}$ party integration service 66 may operate as an API on an app provided on the user's device, or as a dedicated cloud based service. The $3^{rd}$ party integration service 66 may optionally make the virtual object (for example, as expressed by the virtual object generator 62), and/or the genomic information available for external use. Examples of such a use may include skins on $3^{rd}$ party video game characters, objects capable of being used by $3^{rd}$ party video game characters (see FIG. 9), digital artwork displays, physical print generation, manufacturing production, and the like. In an example, the genomic information and/or rarity score may be made available, and may alter the traits or abilities of a user's video game character in a video game played on the user's device 39 (see FIG. 10).

As further shown in FIG. 3, in one configuration, a corporate host system 68 may be in communication with the blockchain 60 for the purpose of provisioning and/or initially creating new digital assets. Additionally, the host system 68 may provide one or more rules to the virtual object generator 62 to constrain the manner and style in which genomic information from the blockchain 60 is expressed in a visual/artistic form.

Figure 4:
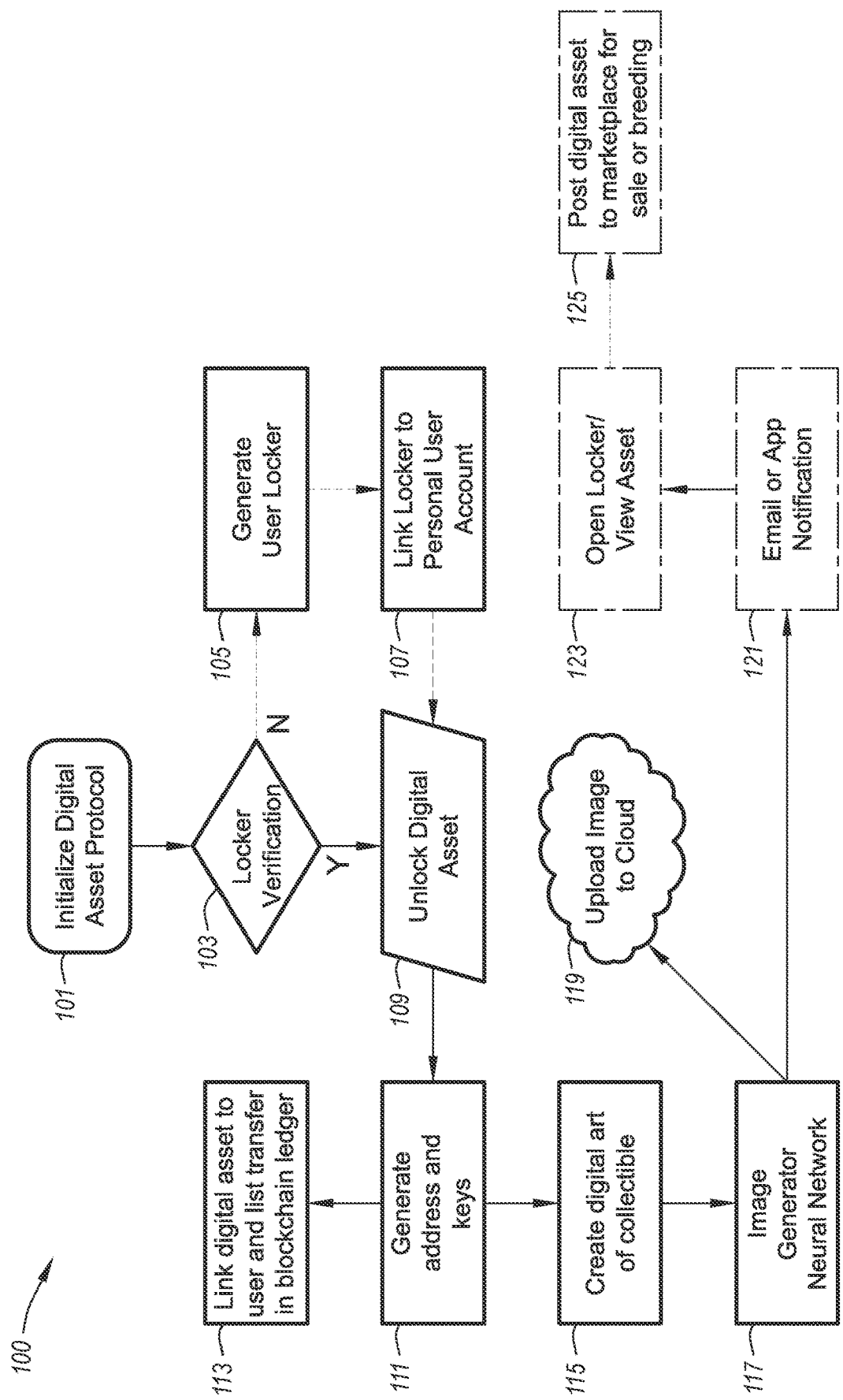
FIG. 4 is a flowchart illustrating a representative workflow algorithm for generating collectible digital shoes protected by cryptographic tokens on a blockchain ledger, which may correspond to memory-stored instructions executed by control-logic circuitry, programmable electronic control unit, or other computer-based device or network of devices in accord with aspects of the disclosed concepts.

With reference now to the flow chart of FIG. 4, an improved method or control strategy for generating collectible digital assets protected by cryptographic tokens on a blockchain ledger is generally described at 100 in accordance with aspects of the present disclosure. Some or all of the operations illustrated in FIG. 4 and described in further detail below may be representative of an algorithm that corresponds to processor-executable instructions that may be stored, for example, in main or auxiliary or remote memory, and executed, for example, by a resident or remote controller, central processing unit (CPU), control logic circuit, or other module or device or network of devices, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 100 begins at terminal block 101 with processor-executable instructions for a programmable controller or control module or similarly suitable processor to call up an initialization procedure for a protocol to generate a cryptographic digital asset, such as computer-generated digital shoe 44 and encrypted token key 46 of FIG. 2, for a consumer product, such as sneaker 10 of FIGS. 1 and 2. This routine may be called-up and executed in real-time, continuously, systematically, sporadically, and/or at regular intervals. As a representative implementation of the methodology set forth in FIG. 4, the initialization procedure at block 101 may automatically commence each time a pair of authentic footwear 10 is manufactured, each time a user 11 purchases a real-world pair of the footwear 10, or each time the user 11 unlocks the access key 46. Alternatively, the initialization procedure may be manually activated by an employee at a POS terminal or by the manufacturer.

Utilizing a portable electronic device 39, such as smartphone 40 or smartwatch 42 of FIG. 2, the user 11 may launch a dedicated mobile software application ("app") or a web-based applet, such as NIKE+®, that collaborates with a server-class (backend or middleware) computer (e.g., remote host system 34) to communicate with the various peer devices on decentralized computing system 30. During a communication session with the host system 34, for example, the user 11 may purchase a pair of the footwear 10 using a corresponding feature provisioned by the app. The user 11 enters personal information and a method of payment to complete the transaction. Upon completion of a validated payment, the host system 34 receives, e.g., from an online store transaction module or an approved third-party electronic payment system, a transaction confirmation to indicate a validated transfer of the footwear 10 to the user 11 has been completed. As indicated above, validated transfer of the footwear 10 may be effectuated through any available means, including at a brick-and-mortar store, through an online auction website, an aftermarket consumer-to-consumer trade/sale, etc.

Method 100 continues to decision block 103 to determine if the user 11 has procured a cryptocurrency wallet or other similarly suitable digital blockchain locker that is operable, for example, to upload and maintain location and retrieval information for digital assets that are encrypted and stored in a decentralized manner. A cryptocurrency wallet typically stores public and private key pairs, but does not store the cryptocurrency itself; the cryptocurrency is "decentrally" stored and maintained in a publicly available blockchain ledger. With the stored keys, the owner may digitally sign a transaction and write it to the blockchain ledger. A platform-dictated smart contract associated with the locker may facilitate transfer of stored assets and create a verifiable audit trail of the same. If the user 11 has not already acquired a digital blockchain locker (Block 103=NO), the method 100 continues to predefined process block 105 to set up a blockchain locker. By way of non-limiting example, user 11 may be prompted to visit or may be automatically routed to any of an assortment of publicly available websites that offer a hardware wallet for cold storage of cryptocurrency and digital assets, such as an ERC20-compatible Ethereum wallet provided by MYETHERWALLET™.

Once the system confirms that the user 11 has a suitable digital blockchain locker, the method 100 may automatically link, or prompt the user 11 to link, the digital blockchain locker to a personal user account (e.g., a NIKEPLUS® account profile), as portrayed at process block 107 of FIG. 4. This may require the remote host system 34 retrieve a unique owner ID code (e.g., CryptoKick Owner ID 48 of FIG. 2) associated with the purchasing party (e.g., user 11) from an encrypted relational database (e.g., provisioned through cloud computing system 36). At this time, a unique physical shoe ID code (CryptoKick Physical ID 50 of FIG. 2) associated with the purchased footwear 10 may be linked to the user's personal account.

Upon determining that the user 11 has acquired a digital blockchain locker (Block 103=YES), or after linking the user's blockchain locker to their personal user account (Block 107), the method 100 continues to input/output block 109 to enable or "unlock" a cryptographic digital asset associated with the footwear 10 transacted at process block 101. As indicated above, after purchasing the footwear 10, the CryptoKick Physical ID or a universally recognized UPID product code may be used to retrieve a collectible CryptoKick, which is generally composed of a collectible digital shoe 44 and a unique NFT that is identified by an encrypted token key 46. A salesperson at a POS terminal or the user 11 employing their smartphone 40 may scan the UPID or UPC on the shoe 10 or a box storing therein the shoe 10. Alternatively, the user 11 may be prompted to carry out a "treasure hunt" using a digital camera on their smartphone to scan various UPIDs throughout a brick-and-mortar store until they scan one that is linked to a KickID. Enabling a cryptographic digital asset may be automatic, random, systematic, prize based, or any logically appropriate manner.

After receiving confirmation that a cryptographic digital asset has been authorized at input/output block 109, the method 100 generates a cryptographic digital asset for the transacted article of footwear. This may comprise generating a unique, encrypted asset code with an address, a token, and a public and private key pair, as denoted at predefined process block 111. Host system 34 may transmit the token, with the public key and the owner ID, to a distributed blockchain ledger to record and peer-validate transfer of the cryptographic digital asset to the user 11 on a transaction block. The method 100 continues to process block 113 to link the cryptographic digital asset with the unique owner ID code. This control logic may comprise executable instructions for assigning the encrypted asset code to the user 11 and storing the public and private keys in the user's digital blockchain locker.

With continuing reference to FIG. 4, the method 100 proceeds to process block 115 to produce the virtual representation or "digital art" of the cryptographic digital asset. Continuing with the footwear example of FIG. 2, the virtual representation may include a computer-generated avatar of the shoe 10 or a limited-edition artist rendition of the shoe 10. It is also envisioned that one or more attributes of the virtual representation of the cryptographic digital asset may be created, in whole or in part, via the user 11. A machine learning function may be executed at predefined process block 117 in order to generate image features through a neural network. Upon completion of the digital art, the image may be uploaded to cloud computing system 36 at block 119. In addition, optional process block 121 may issue a digital notification, such as an email or push notification, to the user's smartphone 40, smartwatch 42, or other personal computing device, with all related information for accessing, transferring, and intermingling the cryptographic digital asset. The remote host system 34 may operate as a web server hosting a web-based graphical user interface (GUI) that is operable to translate the data stored in the encryption keys into a visual image that is displayed to the user 11 at optional process block 123. Digital asset manipulation and use may also be effectuated through the user's digital blockchain locker. This may comprise posting the cryptographic digital asset to an online crypto-collectible marketplace for sale or breeding, as provided in optional process block 125.

Prospective and current owners of a cryptographic digital asset, such as the CryptoKick of FIG. 2, may buy and sell digital assets through one or more blockchain ledgers operating on the decentralized computing system 30. By way of example, and not limitation, a user may buy a new pair of highly sought after sneakers from a verified vendor who may provide authenticated provenance records for the sneakers. While the sneakers are in transit, the user may receive an email notification with detailed instructions for unlocking a CryptoKick once the shipment arrives. After receiving the shoe box containing the purchased sneakers, the user scans the box UPC with a barcode scan feature in a sneakers app operating on the user's smartphone. In the sneakers app, a new profile page is responsively enabled; the sneakers app opens the new profile page. For at least some applications, the new profile page is linked with, exported to, or initially enabled in the user's personal (NIKEPLUS®) account profile. Private and public blockchain platform keys are generated, genotype and phenotype data are created, this data is embedded in segments of the public key's alphanumeric code, and the virtual representation of the CryptoKick is engendered. The CryptoKick's blockchain data, token, etc., are assigned to the user's new address; the new profile page lists the CryptoKick the user has acquired.

A user may wish to lease, license, or assign his/her new CryptoKick to any of one or more prospective buyers. In one example, a seller (also referred to herein as "transferor" or "first party") offers to sell, and a buyer (also referred to herein as "transferee" or "second party") agrees to buy a CryptoKick for an agreed-upon sum (e.g., three (3) ETH). The buyer may be interested to make such as purchase as the available CryptoKick has one or more attributes (e.g., artist, body type, colorway, etc.) the buyer is looking to add to a collection. The seller may initiate the sale process by marking a specific CryptoKick in the sneaker app as "For Sale" via a corresponding soft-key "auction" button. Sally may set a minimum bid and/or a buy now price, and provide an auction time window of a selected number of hours, days, weeks, etc. The sneaker app may present the seller with a share modal in which he/she can either share the auction via usual social media, or present a quick-response (QR) code for a potential buyer to scan. The buyer may then scan the QR code using a smartphone digital camera through operation of a scan feature in the sneaker app, and transmit the requisite funds (e.g., 3 ETH) to the auction site. The seller's sneakers app notifies him/her of the payment; the seller is prompted to agree to a terms of sale and finalize the transaction. The CryptoKick is then transferred from the first party to the address of the second party.

Figure 6:
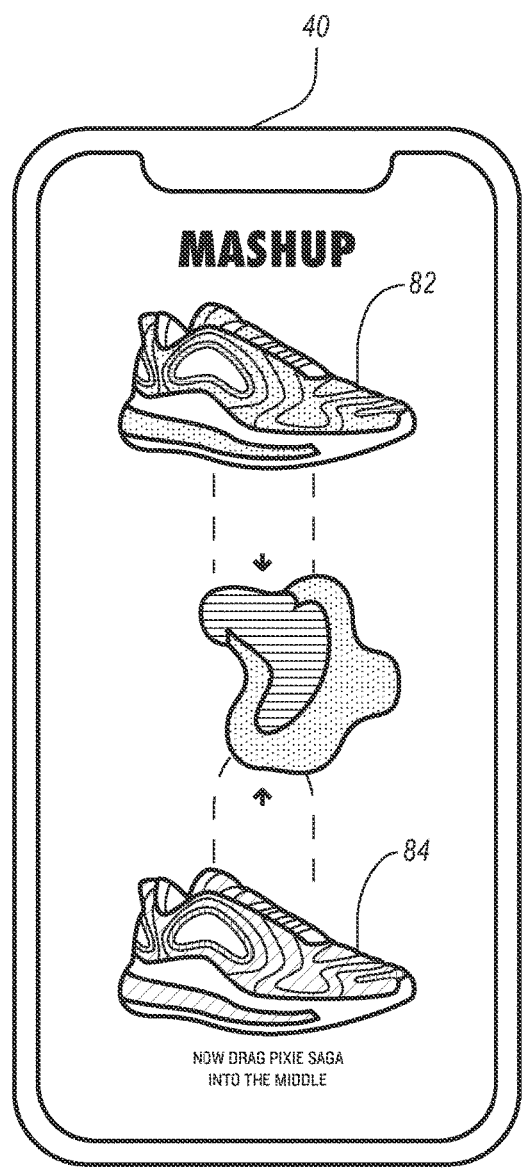
FIG. 6 is an illustration of a representative GUI of a personal computing device illustrating a collaboration or breeding event between two cryptographic digital assets.

Owners of cryptographic digital assets may wish to intermingle or "breed" their digital assets with other digital assets to create asset "offspring," such as schematically shown in FIG. 6. A first digital asset owner and a second digital asset owner may wish to collaborate and crossbreed their digital assets 82, 84 in order to create a new cryptographic digital asset. The first owner may be set as a "primary artist" if his/her digital asset has attributes desired by the second owner. In this instance, the second owner may initiate a smart contract with the first owner to collaborate. One or both parties may fund the contract with physical or digital currency, e.g., to pay for the transfer, a "collab fee" set by the breeding host site, and an optional siring fee for the second owner's siring services. Once both parties agree to and sign the breeding contract, one or both parties may be prompted to select one or more traits from their "parent" digital asset to transfer to the resultant "progeny" digital asset. Alternatively, the breeding host site may employ a breeding algorithm to build a new digital asset from two or more preexisting digital assets.

A "CollabScience" Algorithm may be employed to determine which contributing cryptographic digital asset will be designated as the sire, determine which contributing cryptographic digital asset will be designated as the dam, and determine which code subsets from each parent asset will be employed to build the cryptographic token key for the resultant digital asset. For example, the token keys for the two parent digital assets, DA1 and DA2, may appear as:

DA1: 4352635657387611432650689983886720809286850-0208293093397812 14

DA2: 1997670191981520482540801616208235668515-3938542456615721260 51434

The CollabScience algorithm may use a random number generator (RNG) or other applicable means to generate a random number, e.g., between 0 and 65535. In accord with this example, the random number may be 21123. Once generated, the Collab Science algorithm may convert the resultant number 21123 to a binary code: 0101001010000011. Concomitantly, with the first number in the binary code being zero (0), the first parent digital asset DA1 is designated as the sire and corresponds to all zeros in the string; with the first parent digital asset DA1 being designated as the sire, the second parent digital asset DA2 is automatically designated as the dam and corresponds to all ones in the string.

Continuing with the above example, the Collab Science algorithm segments the parent token keys into multi-digit code subsets or "chunks"; in this example, each parent token key is broken into sixteen (16) 4-digit code subsets:

Segmented DA1: ['4352', '6356', '5738', '7611', '4326', '5068', '9898', '3886', '7208', '0892', '8668', '5002', '0829', '3093', '3978', '1214']

Segmented DA2: +['1997', '6701', '9198', '1520', '4825', '4080', '1616', '2082', '3566', '8515', '3938', '5424', '5661', '5721', '2605', '1434']

The Collab Science algorithm then builds a new token ID for the resultant "progeny" digital asset based on the digits in the random number, with the sixteen chunks of the child token key being sequentially assigned a one or a zero based on the binary code of the above-generated random number. From this example, the first number in the binary code version of the random number is zero; the first parent digital asset DA1 is the designated sire, which corresponds to zero; as a result, the first chunk in the child token key will be copied from the first chunk of the sire and is, thus, set to 4352. Next, the second number in the binary code version of the random number is one; the second parent digital asset DA2 is the designated dam, which corresponds to one; as a result, the second chunk in the child token key will be copied from the second chunk of the dam and is, thus, set to 6701, and so on and so forth until all sixteen chunks in the child token key are filled with corresponding chunks from the parent token keys. The resultant new array for the child digital asset DA3 will therefore look like:

Segmented DA3: +['4352', '6701', '5738', '1520', '4326', '5068', '1616', '3886', '3566', '0892', '8668', '5002', '0829', '3093', '2605', '1434']

The Collab Science algorithm produces the new token key ID from the array as:

4352670157381520432650681616388635660892866 85-00208293093260 51434

The Collab Science algorithm then processes the cryptographic digital asset, produces the virtual representation of the new asset, and assigns the asset to the buyer's digital blockchain locker.

It is envisioned that other techniques may be employed to determine the attributes of a progeny digital asset. For instance, a Punnett Square may be implemented to express the dominant and recessive traits ("genes") from the two parent digital assets, and create probabilities of a trait expression in an offspring digital asset. A Punnett Square is a graphical mechanism used to calculate a mathematical probability of a child asset inheriting a specific trait from two parent assets. The resultant array is provided by arranging the genotypes of one parent across the top of a table and that of the other parent down one side to discover all of the potential combinations of genotypes that can occur in a child given the genotypes of the parents. As seen in FIG. 2, the genotype and phenotype information contained in encrypted token key 46 includes the digital shoe's: breeding attributes ("collab"), materials information, make data ("family"), manufacturing requirements ("heat"), color combination ("colorway"), future attributes, model data, and image background information.

Epigenetic factors may result in heritable phenotype changes that do not involve alterations in an underlying DNA sequence. In some instances, genotypic changes in an encrypted token key may be caused by real world and/or virtual interactions, leading to alterations of a cryptographic digital asset's phenotypic characteristics. A gene representing high heat and rare heat could be changed from Hhrr to HHRR due to epigenetic factors like the following: usage of real-world shoes may increase a likelihood of a genetic mutation or passing of a "good qualities" variation of genes to offspring; real world workouts, like running or sports, may increase a good gene mutation or increase speed of maturity of a progeny asset; checking into stores or other real-world criterion may lead to positive gene mutation, passing of "good traits" to offspring, speed up maturity; time-dependent breeding that prevents two cryptographic digital assets from crossbreeding before both assets reach a minimum age, otherwise breeding may fail or increase probability of passing "bad qualities" genes to progeny; unique breeding times may cause genetic mutations; frequent interactions (e.g., trading, selling, buying, and collaboration) with other assets or other apps may lead to positive gene mutation, passing of "good traits" to offspring, or speed up maturity.

In may be desirable that a cryptographic digital asset have its underlying genotypic information or phenotypic expression altered (e.g., mutated or edited) using an acquired cryptographic digital attribute (an "attribute pack"). The cryptographic digital attribute may include a subset of the genotypic and/or phenotypic traits that is less than a complete expression of a cryptographic digital asset. In a shoe context, a CryptoKick attribute pack may include genotypic and/or phenotypic information related to one or more discrete features of the digital shoe, though fewer features than a complete CryptoKick. Example attributes may include a style of a heel counter, laces, toe bumper, logo, colorway, and the like. When the cryptographic digital attribute is intermingled with the cryptographic digital asset, one or more of the genotypic code segments or phenotypic expressions may either be directly replaced with those of the asset, or may be bred to create a progeny attribute that involves a probabilistic combination of the preexisting attribute and the attribute expressed in the attribute pack. The resulting, mutated/edited digital asset (and/or asset ID code) may then be recorded to the distributed blockchain ledger.

The ability to edit and/or mutate discrete attributes of a user's digital asset helps to promote both user engagement and to enable broad options for brand promotion. More specifically, cryptographic digital attribute packs may be released to mutate/modify an asset to include a particular sports team's colors, to include unique features or attributes from a key influencer's similar cryptographic digital asset, or the like. By analogy, this ability for targeted mutation/gene editing may be similar to CRISPR technologies in the biotech landscape. In some implementations, where breeding rules govern the effect of the attribute pack on the digital asset, there may be a probabilistic and/or uncertain result in how the newly introduced attribute is expressed in the resulting cryptographic digital asset. For example, if the attribute pack includes a team-specific colorway, the breeding/intermingling may result in different expressions if intermingled with different underlying assets (or even different expressions if applied to two identical underlying assets).

CryptoKick attribute packs may be provided in a similar manner as "full-fledged" CryptoKicks, however in an example, instead of being provided with a completed article of footwear or apparel, they may instead be provided with the sale of a customizing product or service (i.e., a component or modification kit that is intended to modify an article of footwear or apparel though is short of being a full article of footwear or apparel itself). Examples may include the sale of custom laces, temporary appliqués (e.g., logos or panels adhered via hook and loop fastener, snaps, or non-permanent adhesives), kits for customizing, and/or services for customizing (e.g., dying services, sublimation, sale or application of dye kits or pigments, deposition layering, coloration layering, application of optical effects—modification of structural color, static color, or pearlescence; laser etching services, acid dye washing services; additive manufacturing—3d printing, dimensional painting, etc.).

To better control the distribution of cryptographic digital attribute packs, each pack may be recorded to a distributed blockchain ledger upon creation, thus providing each attribute pack a separate existence. Each cryptographic digital attribute pack may include, for example, a smart contract that terminates the attribute pack's existence or ability to be subsequently intermingled with a different digital asset. As such, an attribute pack may optionally be a single-use ability to edit or mutate an underlying digital asset. Further, in at least some applications, the smart contract aspects may time-limit the ability to intermingle with an underlying digital asset.

Figure 7:
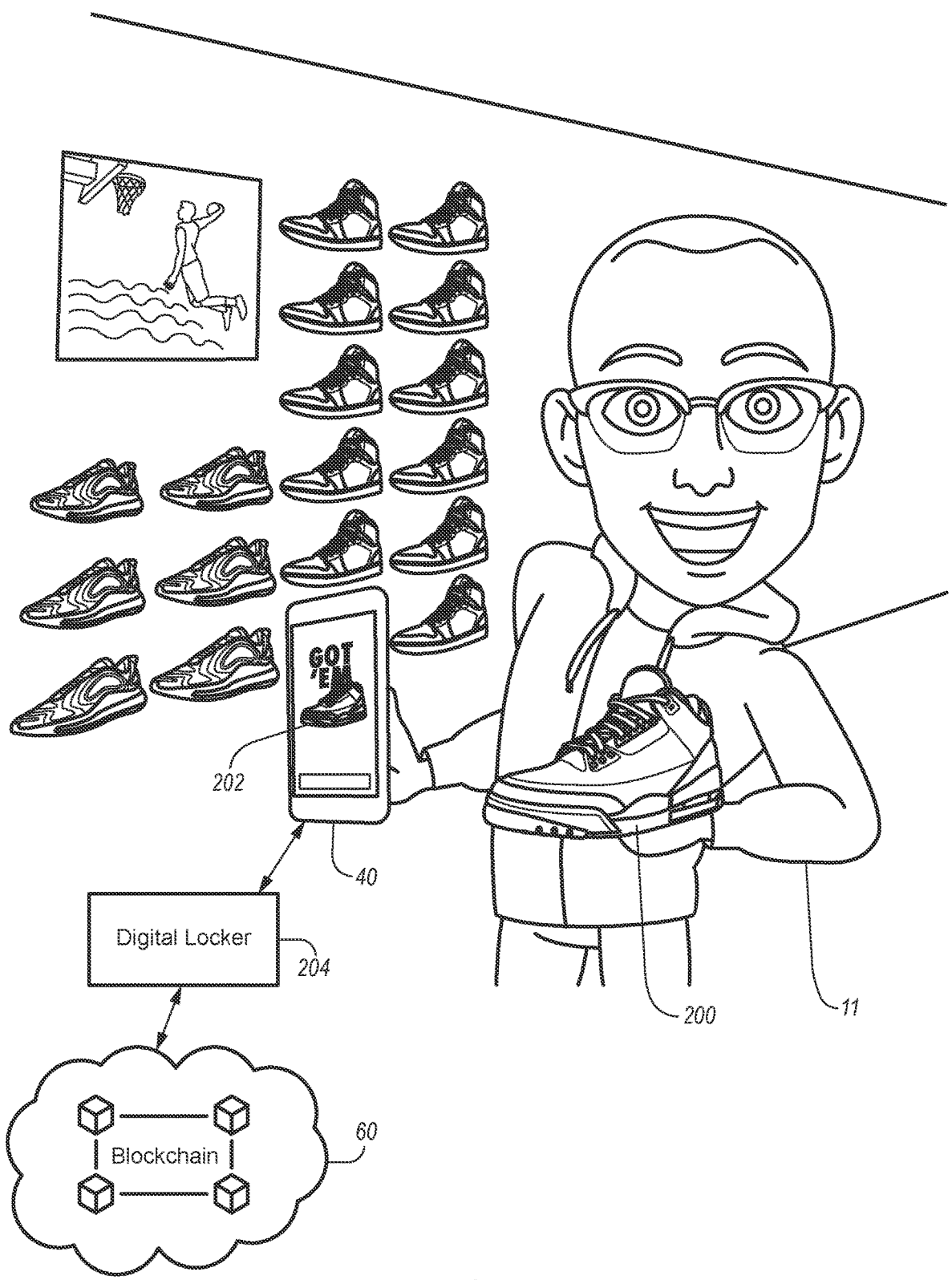
FIG. 7 is a functional illustration of the acquisition of a cryptographic digital asset via a linked retail product.

As noted above, FIG. 7 schematically illustrates a method of acquiring a digital collectable or attribute pack that may be linked or coordinated with the sale of a physical product. Namely, as shown in FIG. 7, the user 11 brings a device (i.e., smartphone device 40) in proximity to a physical product 200 that includes an identifier (UPID), such as a QR Code, barcode, digital image, RFID tag, NFC tag, BLUETOOTH id, registry entry in an embedded processor, or some other machine readable code. This code may then be recognized by the phone 40 either optically, via radio frequency communication, magnetic properties, or via wired data communication. Following the identification/recognition of the UPID, the phone 40 may initiate the transfer and/or original provisioning of a digital asset 202 linked with that product 200 to the user's locker 204 that is in communication with a blockchain service/network 60. In an extension of this concept, the transfer of the digital asset 202 may be further secured using a PIN, cryptographic key, access code, or the like that may be provided, for example, on a receipt following the user's purchase of the product 200.

In an example, should the user 11 acquire a CryptoKick with the purchase of a pair of sneakers, and then subsequently return the sneakers, a smart contract associated with the CryptoKicks may unravel the acquisition and automatically return the token and full right to the CryptoKick back to the company/retailer. In the event the purchaser sold/traded the CryptoKick to a bona fide purchaser (BFP) prior to returning the shoes, this secondary transaction may similarly be unraveled/reversed. With the reversal of this secondary transaction, the BFP may be presented with the option to re-acquire the CryptoKick from the company/retailer for a predetermined price (e.g., a prevailing price for the asset, at a discount to a prevailing price, at a fixed price set prior to market release, or for a nominal amount). In another embodiment, the BFP of the CryptoKick may have the first right of refusal to acquire/purchase the retuned physical product. This may be significant in the case of limited release sneakers that are, by definition, scarce.

FIG. 8 schematically illustrates a method of acquiring a digital collectable or attribute pack such as during a promotional giveaway. As shown, the user 11 may locate a virtual object 210, such as a CryptoKick, in an arena 212 using an AR capability of a smartphone 40. In this example, the CryptoKick may be "hidden" in a scoreboard 214, though may be freely recognizable using an app on the phone that interfaces with a camera on the phone. The app may illustrate the virtual object on a display when the camera recognizes a specific environmental optical pattern (i.e., the scoreboard within the arena), and when the phone is geolocated within a particular area (i.e., via GPS sensing, beacons, geofencing techniques, WiFi connectivity, and the like. Once located, the user 11 may be prompted to scan a unique code, such as the barcode on a ticket, a unique code provided on a program or physical item (e.g., noise maker, light stick, towel) that may be placed on the user's seat prior to the game. This code may be associated and/or linked with an allocated, registered, or pre-provisioned cryptographic asset and KickID. Once this code is scanned or entered, the phone 40 may initiate the transfer of the digital asset 202 to the user's locker 204 that is in communication with a blockchain service/network 60. For example, the smartphone 40 may communicate the code to a server, where an associated KickID may be looked up and then transferred to a locker associated with the user's ID.

In an even more general brand promotion case, the need to locate a virtual object may not be strictly required to receive the CryptoKick or attribute pack. Said another way, a server, such as a middleware server, may receive an indication that a user device is at a particular venue during a particular event. This indication may be derived from GPS-based position coordinates that are determined from a GPS receiver on the user device. More specifically, the determined GPS coordinates may be compared to a pre-defined geofenced area around the venue and the indication may represent whether the device is inside or outside of the venue. Alternatively, the indication may result from the device being in proximity to one or more 802.11 or BLUETOOTH beacons located at the venue, or optical recognition, via a camera on the device, of specific visual characteristics of the venue.

The server may then prompt the user, via the user device, to scan a unique identifier that should be readily obtainable by a person in attendance at the event. Example unique identifiers may include a ticket barcode, a code on a physical object, a code on the user's seat, a code printed on a merchandise receipt, or the like. Once this code is scanned or entered, the server may receive an indication of the user's unique ID and the unique scanned code. The server and/or the user device may initiate the transfer of the digital asset 202 to the user's locker 204 that is in communication with a blockchain service/network 60. Other conditions, such as discovery of an AR object at the venue or the occurrence of a specific event may add further conditional layers that must be fulfilled prior to the server executing the transfer. As an option, a user device may record the device's presence at the location and/or time, and claiming of the CryptoKick may be available for a predetermined period of time following the event.

The ability to acquire the CryptoKick may further be initiated by an aspect of the game/event, rather than by locating an AR object or by presence at the event alone. Examples of such triggering events may include, for example, a shut-out (hockey/baseball), no-hitter (baseball), 50+ point individual performance (basketball), a triple-double (basketball), a hat trick (soccer/hockey), a scoreless quarter/period/half (basketball, hockey, soccer), and overtime/extra innings. In such an embodiment, the occurrence of the event may trigger an alert on the user's device 39, which would prompt the user to scan their ticket to facilitate the transfer. In an example, to eliminate a secondary market for ticket stubs, the app on the user's device that facilitates the notification may require that the scan occur only within a predetermined geofence and/or time of the game/event. In a further extension, the marketplace (described above) may further permit the user 39 to prospectively sell the unvested right to the CryptoKick if the triggering event were to occur. This would resemble the user writing and selling a tradable option to the CryptoKick that either expires worthless, or results in the option purchaser acquiring the CryptoKick.

It should be appreciated that in any of the above-described CryptoKick acquisition methods, an attribute pack may be obtained through similar means/techniques. For example, in an example, a user's presence at a sporting event may enable them to receive an attribute pack comprising a colorway of one of the team's colors. This attribute pack may then be intermingled with an existing CryptoKick to mutate or edit an existing colorway attribute toward the team color scheme. Optionally, transmitting the unique scanned code may then direct an application or browser on the user's device to a virtual storefront where colorway attribute packs of each teach may be made available, and where the user is prompted to select one for acquisition. Similar virtual storefront techniques may similarly be useful for the selection and transfer of CryptoKicks as well.

Figure 9:
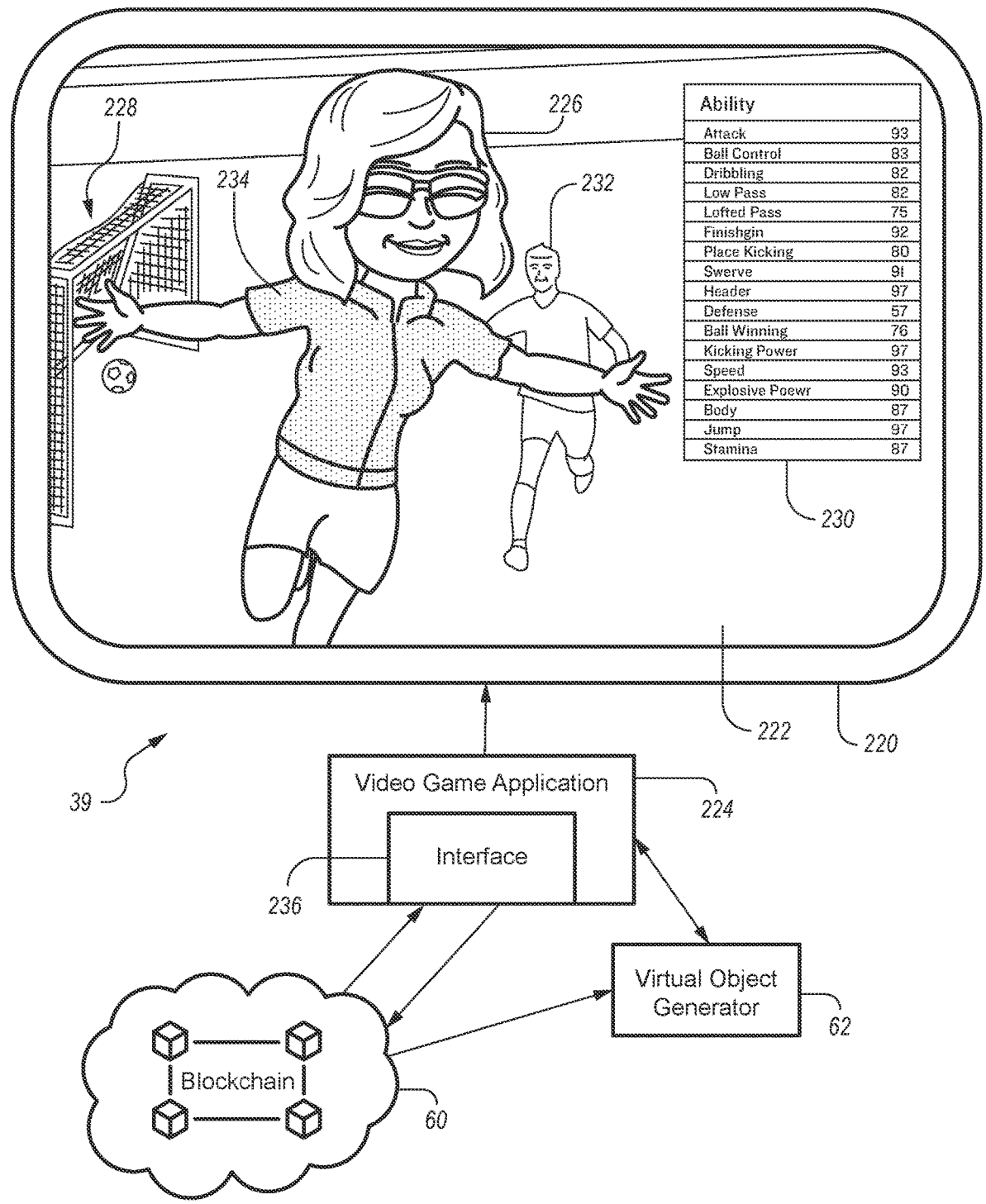
FIG. 9 is an illustration of a representative GUI of a personal computing device illustrating the use of genotypic and phenotypic characteristics of a cryptographic digital asset within a video game.
Figure 10:
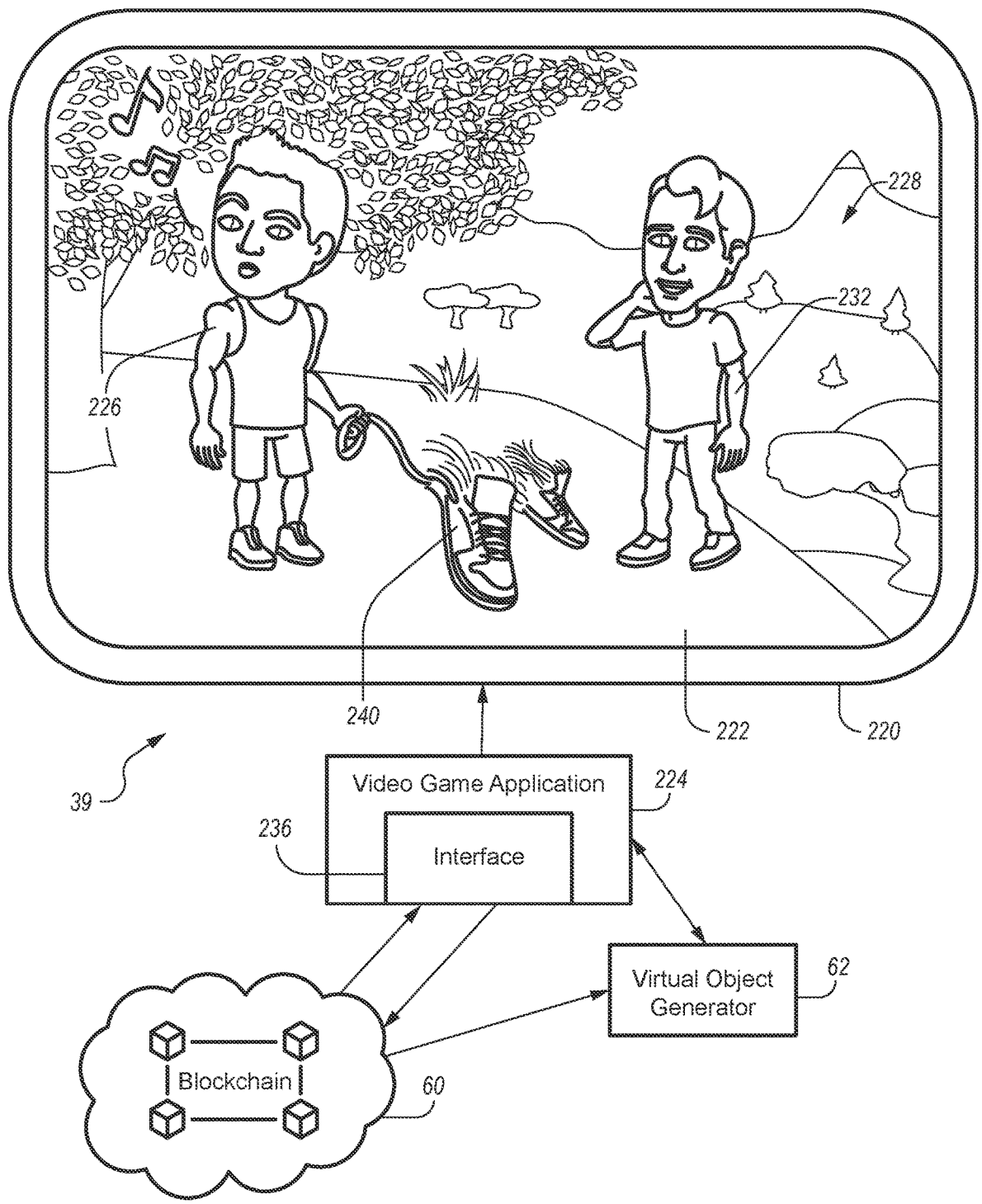
FIG. 10 is a functional illustration of a representative GUI of a personal computing device operating on a decentralized computing system for provisioning virtual user interactions that alter genotypic and phenotypic characteristics of a cryptographic digital asset in accordance with aspects of the present disclosure.

FIGS. 9 and 10 schematically illustrate a video game interface 220 including a display 222. The video game interface 220 and/or display 222 may be integral with a user device 39 (e.g., a smartphone 40 or tablet), or may be a standalone gaming console coupled with a display 222. The device 39 may generally be configured to execute a digital application 224 that requires user input to control a virtual character 226 within an environment 228. The character 226 may include or be defined by a plurality of attributes 230 that may affect how the character 226 behaves, responds, or performs within the environment 230, and/or how the character 226 interacts with other characters 232 that may be controlled by the application 224 or by other users in a networked environment.

In one context, the character 226 may be an athlete and the environment 228 may be a sporting environment. FIG. 9 illustrates such a character 226 as a footballer, and the environment 228 as a football pitch within a stadium. The character's attributes 230 may include, for example, speed, ball control, passing, defense, kicking power, balance, and stamina (among others). In an example, the character 226 may be outfit/skinned with a digital collectable (e.g., an article of apparel 234) that may be uniquely backed by a token on the blockchain 60. In an embodiment, the digital collectable may have been acquired in any one of the manners described herein. In one configuration, the application 224 may access the genetic code of the digital asset on the blockchain 60 via an API or other software interface 236 (i.e., an embodiment of the 3$^{rd}$ party interface 66 described above) and/or may access the phenotype expression of the object either via an integrated software decoder or by accessing a networked virtual object generator 62 of the kind described above. In one configuration, one or more of the attributes 230 may be positively or negatively influenced by the genetic code or phenotype expression of the object 234. While FIG. 9 illustrate the object as an article of apparel, it may similarly be an article of footwear, an object the character may use, a piece of sporting equipment, or the like.

Further building upon the notion of the CryptoKick as property, in an example, a user or company may rent out or lease out the use of the digital collectable within a video game for a period of time. In an example, the leasing may be constrained so that only one instance of a particular user's asset exists in any particular context. For example, a user may own full rights to an exclusive CryptoKick. That user may concurrently lease out the CryptoKick for use in Basketball Game A for 1 week, Soccer Game B for 2 weeks, and 1$^{st}$ Person Shooter Game C for 3 weeks.

Another option may include programming a cryptographic digital asset as a virtual "pet" that a user cares for and helps to grow from a baby to an adult. FIG. 10, for example, illustrates a user's avatar 226 taking his pet CryptoKicks 240 for a virtual walk and interacting with an avatar of another user 232 within an environment 228 representative of a virtual world. As mentioned above, such virtual interactions may affect the evolution, value, rate of maturation, visual appearance, marketability, etc., of the pet CryptoKick. The attributes of the digital asset may change with age or be unlocked over time. A user may care for the virtual pet directly or source to a third party (e.g., through ETH payment or transaction by other means). The virtual pet may go through various life stages, and concomitantly unlock different real-life sneaker versions of itself that a user can then purchase in stores.

Referring again to FIG. 9, much like the virtual pet of FIG. 10, gameplay, use of the digital asset, or improvements in a character's level, experience, or accomplishments may operatively alter/modify one or more genotypic and/or phenotypic attributes of the digital asset/CryptoKick. Similarly, gameplay, use of the digital asset, or improvements in a character's level, experience, or accomplishments may operatively modify the effect that the digital asset has on the character's ability or gameplay. For example, in an example, achievement of a new level, tournament victory, global ranking above a predefined threshold, or other similar accomplishments may modify an attribute of the CryptoKick to have a distinctive or limited availability appearance, colorway, skin, or the like. Likewise, such accomplishments may serve as a multiplier on the effects that the digital asset imparts to the character.

Figure 11:
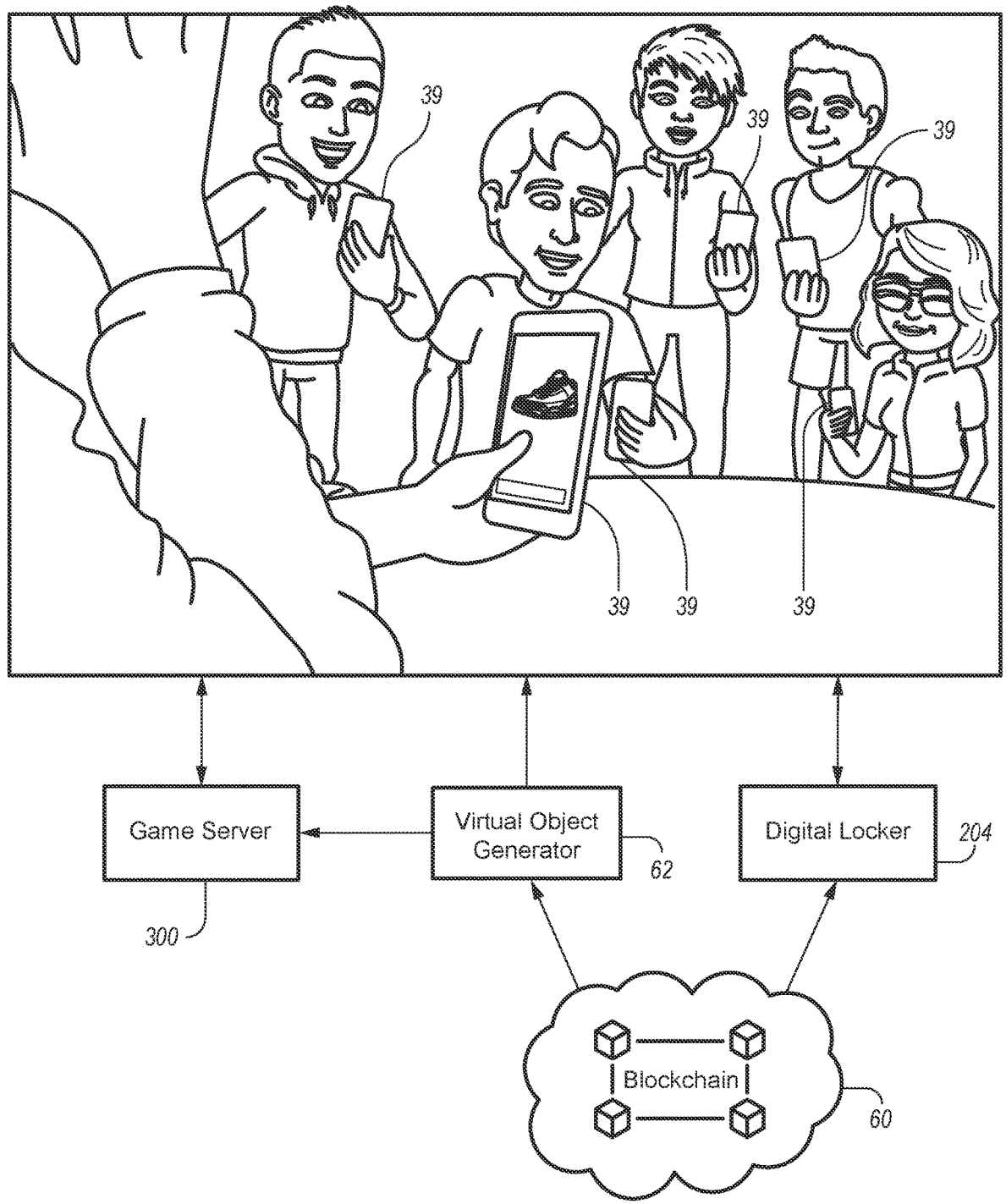
FIG. 11 is a functional illustration of a plurality of users engaged in a collaborative experience such as participating in a digital collectable card game.

Referring to FIG. 11, a set of digital assets may take the form of, or may be used in a digital collectable card game (DCCG). In such a game, each user may have a collection of digital assets, each with a different set, balance, or weighting of attributes/attribute scores, and/or different features, abilities, or powers. Users may optionally take turns playing individual cards or groups of cards in an effort to win according to the rules set by the game.

While collectable card games, themselves, are generally well known, the use of the presently described digital assets may provide a unique extension of these games. Furthermore, these games may serve as an additional use and motivation for collecting the digital assets. By uniquely securing each digital asset to an immutable database such as a blockchain 60, each player's collection of cards and their required strategy for using those cards will likely be unique also.

In such an embodiment, a game server 300 may be in communication with a plurality of different user devices 39. As with above, the user devices 39 may be smartphones 40, smart watches 42, tablet computers, laptop computers, web enabled devices, or other such devices that are capable of networked communication with the server 300. Each user device 39 may be linked to a separate digital locker 204, which may permit the user to access their securely stored digital assets from the blockchain 60. Each asset may be represented as a separate digital card on the user's device, and may have its own unique attribute set (i.e., part of the phenotype). In an example, a virtual object generator 62 may be in communication with the user devices 39 and/or the game server 300 to create the expression of the virtual object from the genotypic information associated with the token on the blockchain 60. The game server 300 may manage the rules of the game, including maintaining a plurality of user accounts, instructing a first user, via the user's device 39, when it is time to play, and altering an attribute of a second user's account based on the receipt of digital asset data from the first user. The received digital asset data may correspond to a digital asset played by the first user via the first user's device.

In an example, the game server 300 may not have any stored understanding of a user's collection of digital assets until digital asset data is received. As such, in this embodiment, the asset collection for a user may be maintained solely by the user's device. In an alternate embodiment, a user's collection of assets may be registered with the user's account maintained by the game server 300. In this configuration, the digital asset data may simply be an indication of which card in the user's account was played.

While FIG. 11 is intended to illustrate a plurality of users engaged in a DCCG, in an alternate configuration, the illustration may be representative of a meet-up where a plurality of users come to a common location for the purpose of breeding their CryptoKicks. Such an event may be coordinated by a central server that is linked to user accounts in a local area. Alternatively, users may have the ability to sponsor events and/or broadcast their own location for others to connect and/or create a user-initiated meet-up or invitation.

In at least some applications, the attributes of a cryptographic digital asset can be directly related to corresponding attributes of a real-world shoe for purposes of production. Optionally, digital asset attributes may be linked to a bill of materials for cost calculation and as a control mechanism. Resulting offspring may be restricted to having phenotype characteristics that can be created in the real world based on manufacturing capabilities, materials, and other factors. As CryptoKicks and CollaboKicks change owners due to selling, trading, buying, and collaboration, the resultant transaction history is tracked within the blockchain. Once a CollaboKick or CryptoKick that does not currently exist is created in real life, previous owners/users may be notified of such real-life existence and may be given an option to purchase the sneaker.

Figure 12:
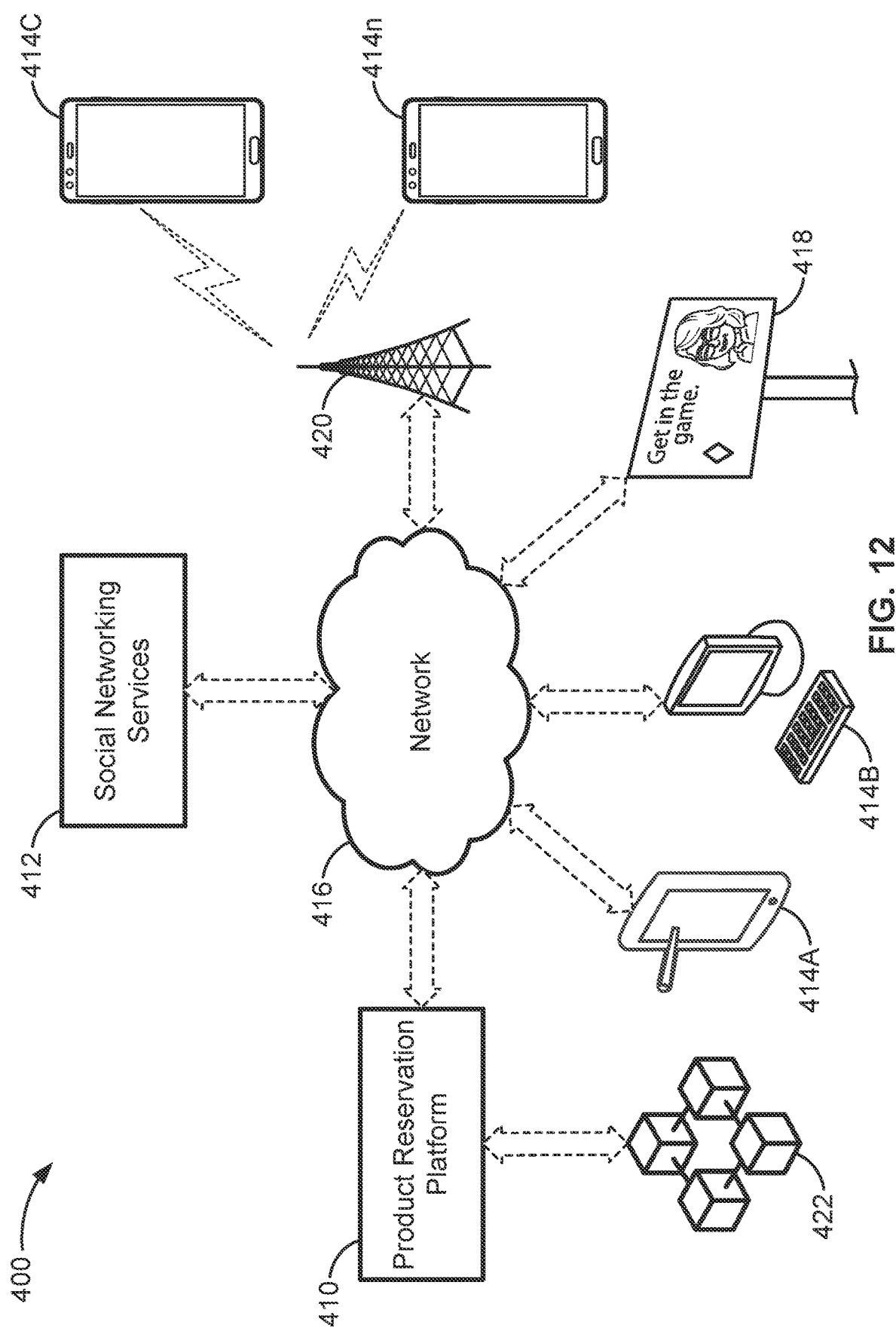
FIG. 12 is a diagrammatic illustration of another representative decentralized computing system for provisioning cryptographic digital assets during transaction of retail products in accordance with aspects of the present disclosure.

Turning next to FIG. 12, there is shown an example of a distributed computing system, which is designated generally at 400 and portrayed herein for purposes of discussion as a client-server oriented decentralized computing architecture for provisioning cryptographic digital assets during retail product transactions. Although differing in appearance, the representative computing system 400 of FIG. 12 may include any of the options and features described above with respect to the system architectures and retail products shown in FIG. 1-11, and vice versa. In accord with the architecture of FIG. 12, the distributed computing system 400 enables users to reserve and procure various products, services, events, etc., that have limited availability. Using, for example, different social networking services, electronic billboards, dedicated mobile apps, text messages, push notifications, etc., the system 400 announces the availability to secure limited-release retail products, event tickets, etc. Users may respond to these announcements via a social networking service, text message, or app, with requests to be added to a virtual line or waiting bin. Product reservations with the ability to secure a limited-release retail product, event ticket, etc., may be issued to users that are selected at random from the waiting bin or based on their respective positions in the virtual line.

According to a non-limiting implementation of the architecture presented in FIG. 12, an athletic shoe manufacturer may occasionally fabricate and release limited edition or exclusive edition shoes. NIKE® Corp., for example, may issue an announcement through their SNKRS® sub-site and app of a limited-quantity footwear release (e.g., 1000 basketball shoes in each of sizes 8-14). This limited shoe release is accompanied by a corresponding limited-availability of product reservations that will be obtainable on a given date and/or time. On the release day/time, users access their personal user accounts through the SNKRS® sub-site and app and, if deemed eligible, are placed into a holding bin or a virtual line. The SNKRS® site will then select which of the users are 'winners' and, thus, will be eligible to secure the limited-release sneakers. Winners may be chosen via a random draw, via a random win/loss generator, or via their place in a virtual line. For at least some implementations, a future SNKRS launch experience may require users to locate, scan, and submit a quick-response (QR) code to be eligible for a time-limited, pre-launch event.

During this stage, users may be prompted to engage in virtual activities (e.g., an alternative reality (AR) scavenger hunt) of physical activities (e.g., group relay race) to improve their virtual line position or increase their chances of winning "THE DRAW". If a user engages in a preapproved physical activity or virtual activity during a designated window of time before THE DRAW, they may be rewarded by increasing their chances of winning THE DRAW and/or by earning a multiplier for their activity/membership points. For instance, the user may be awarded with a multiplier of two-times (2×) for NIKE COINS™ during a preset launch window for a next generation pair of AIR JORDAN® 3 White Cement sneakers for playing basketball at least four times a week until THE DRAW. This feature will promote making basketball a daily habit as the user waits for the launch of the limited-release sneakers.

During post-launch, if a user is not selected in The DRAW to secure one of the limited-release sneakers, they are provided with an opportunity to secure one of a number of limited-release CryptoKicks. As indicated above, these CryptoKicks may be similar or identical in appearance, some may be distinctive in appearance, and some may be scarcer and, thus, more valuable than others. After not winning The DRAW for the physical product, a user may be given the option of opting-in to a secondary drawing. In this consolation drawing, users may trade in activity points or membership points to increase their chances of receiving/unlocking one of the limited-release CryptoKicks. For at least some implementations, this post-launch event may be fashioned as a "gashapon" style drawing in which the available assets are of overall higher quality, with some being relatively scarce, and with the users having no prior knowledge of what exactly they may win. As a further option, the cost of entry may include activity points or membership points (i.e., points of some variety that a user receives in response to a favorable activity—for example, purchasing shoes, number of miles run or workouts completed, check-ins, app-engagement, or some other generic activity score). Additionally, the post-launch event may be part of an event-based shoe launch, e.g., during an Esports tournament, at a KPOP concert, etc. Additional information regarding tracking user physical activity and awarding virtual points or virtual currency for such activity can be found, for example, in U.S. Pat. Nos. 9,289,683, 9,940,682 and 9,415,266, all of which are incorporated herein by reference in their respective entireties and for all purposes.

If a user wins The DRAW for the option to purchase/win a pair of limited release footwear, they may be given the option to not purchase/take possession of the physical footwear. Instead, if they choose to decline the physical footwear, they may automatically win a limited-release CK or be given the option to earn an additional multiplier for NIKE COINS™ (e.g., 4×) that will, in turn, increase the user's chances of winning a limited-release CryptoKick. In the same vein, if they win the limited-release CryptoKick, they may be provided with the option to decline the limited-release CK and instead earn an even bigger multiplier (e.g., 8×) for a future drawing for an even more limited CK. Instead of earning more NIKE COINS™ to purchase CKs or other virtual goods, the user may continue turning down winnings to further increase their probability of winning in a future drawing or may use all of their available NIKE COINS™ for a super-exclusive NIKE® "gacha" style experience.

Another available feature provisioned through the distributed computing system 400 is the ability to monitor and minimize aftermarket "scalping" resale of high-demand products, services, events, etc. The resale of limited, exclusive, or special-release footwear was estimated to be a multi-billion dollar industry in 2019. One method used to circumvent standardized protocols for the random dissemination of such footwear is for an entity to release dozens or hundreds of software agent robots (bots) on a website or app to multiply their chances of securing the multiple pairs of footwear. The entity and then immediately turns around and resells the limited-release footwear for 2× to 10× the retail price. To counter these activities, each pair of shoes is assigned with a respective blockchain-backed digital asset that allows the system 400 to track and analyze the chain of title/ownership for each tangible shoe. With this knowledge, the system 400 is able to profile each user account based on, for example, purchasing habits, average time of ownership, resale habits, drawing attendance, and other pertinent data. This knowledge allows a manufacturer/retailer to better allocate future shoe access and allotments to presales, such as affecting the probability of winning a future draw or restricting access to a future draw.

With continuing reference to FIG. 12, one or more users 414A, 414B, 414C . . . 414n on the distributed computing system 400 operate personal computing devices, such as a computer tablet, desktop computer, handheld smartphone, etc., to communicative with a host retail Product Reservation Platform 410 over a wireless communications Network 416. Product Reservation Platform 410 may occasionally broadcast over Network 416 a message announcing the availability of reservation requests for a limited-release retail product. A backend server-class computer or similarly suitable computing device of the Product Reservation Platform 410 may randomly or pseudo-randomly select the date and/or time of the broadcast. Alternatively, the date/time of the product release event may be manually selected by an event planner or other individual. The date and time of the broadcast may be made available to all or only select individuals; optionally, the broadcast time may be withheld from select recipients. After reviewing the broadcast message, a user may respond with a reservation request. Product Reservation Platform 410 may process the received reservation requests on a first come, first serve (FCFS) basis, and send reservation messages to users who successfully reserved a retail product.

Product Reservation Platform 410 may perform a variety of functions associated with a product release event. For instance, the Platform 400 may capture and implement event details as well as compose and schedule broadcast messages through a Social Networking Service 412, on a digital billboard 418, and over a cellular network 420. The Platform 400 may also track reservation confirmations, reservation denials, reservations that are fulfilled, and reservations that are left incomplete, as well as provide overall analytics of such data. Product Reservation Platform 410 may also contain logic that prevents abuse, including: setting quantity limits (e.g., one (1) product per person); issuing encrypted reservation codes; and capturing/storing information for users to verify purchase and a point of delivery/pickup. Product Reservation Platform 410 may also have integrations with customer data management systems that support targeted segmentation of announcement messages. A loyalty program may be implemented where users pre-register for product launches, identify preferred product attributes and interests, accumulate loyalty points and rewards, etc.

Network 416 of FIG. 12 may take on any of the optional configurations and features described above with respect to wireless communications network 38 of FIG. 2. For example, the network 416 may employ available wireless and wireline transmission systems, such as public or private satellite systems, cellular networks, terrestrial networks, etc. Most if not all data transaction functions carried out by the user 14 may be conducted, for example, over a wireless network, such as a wireless local area network (WLAN) or cellular data network. In some implementations, the system 400 can be a web-based system where users or clients 414A, 414B, 414C . . . 414n use internet-based websites and/or web-based applications to access the transaction features disclosed herein. In various aspects, a user's personal computing device includes a web browser or a dedicated, stand-alone application software, or a combination of both. A web browser typically allows a user to search for and/or request a web page (e.g., from a server farm 52) with a web page request. Upon creation of an encrypted digital asset, the Platform 410 may transmit a token, with a matching public key and owner ID, to a distributed blockchain ledger 422 to record and peer-validate transfers of the cryptographic digital asset, such as a unique non-fungible token (NFT), on a transaction block.

Figure 13:
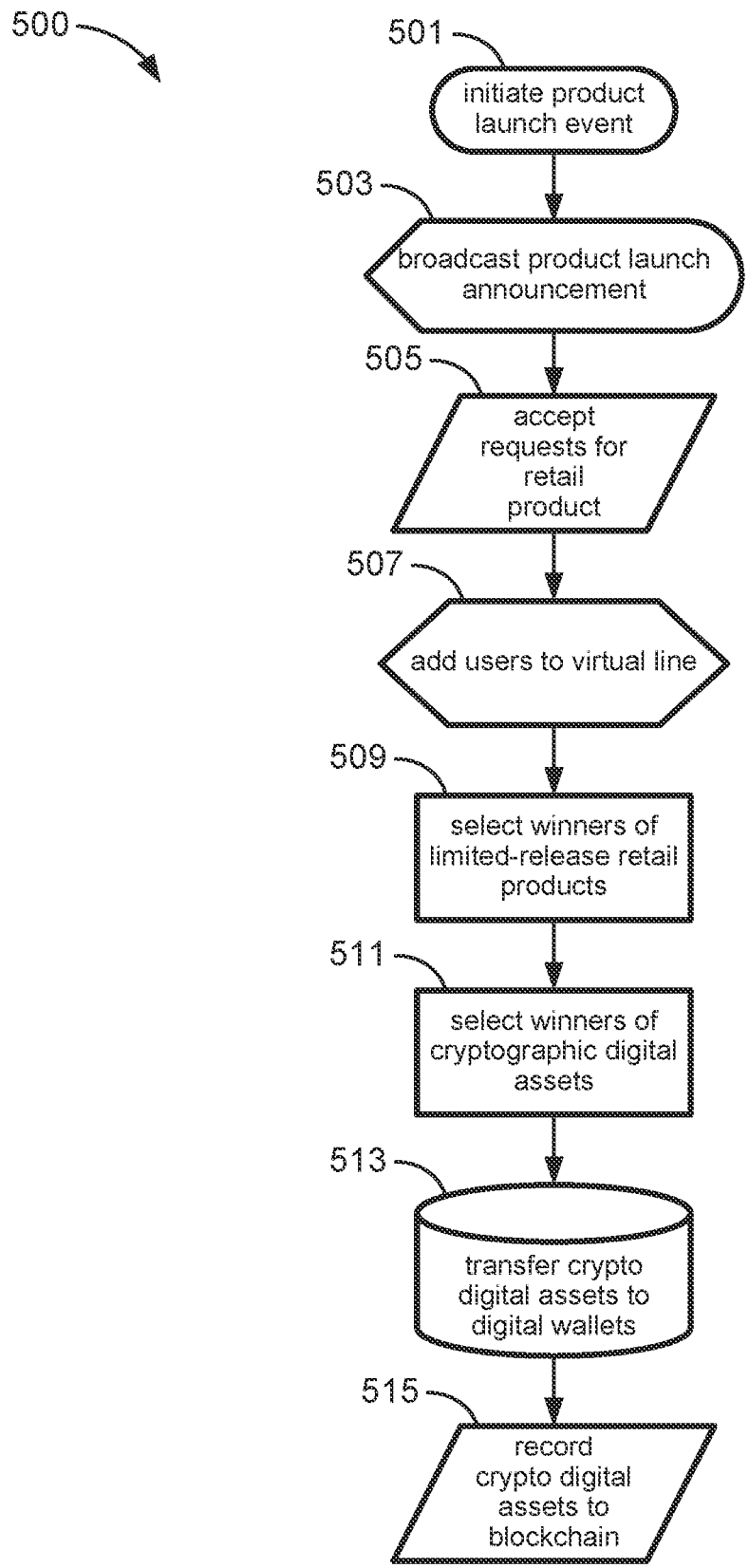
FIG. 13 is a flowchart illustrating a representative algorithm for provisioning cryptographic digital assets associated with transfers of retail products, which may correspond to memory-stored instructions executed by control-logic circuitry, programmable electronic control unit, or other computer-based device or network of devices in accord with aspects of the disclosed concepts The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

With reference now to the flow chart of FIG. 13, an improved method or control strategy for provisioning cryptographic digital assets associated with retail product transfers is generally described at 500. Some or all of the operations illustrated in FIG. 13, and described in further detail below, may be representative of a discrete control algorithm or a subroutine interoperable with the method 100 of FIG. 4 or any of the other techniques and algorithms described above. The illustrated operations may correspond to processor-executable instructions that may be stored, for example, in cache or random-access memory, and executed, for example, by one or more of a controller, central processing unit, control logic circuit, module, device, or network of devices, to perform any or all of the herein described functions associated with the disclosed concepts. The order of execution of the illustrated operations may be changed, additional operations may be added, and some of the operations described may be modified, combined, or eliminated.

Method 500 begins at terminal block 501 with processor-executable instructions for calling up an initialization procedure for a protocol to commence a limited-release product launch event. Terminal block 501 of FIG. 13 may include any of the features and options described above with respect to terminal block 101 of FIG. 4. At data display block 503, a system server computer broadcasts an electronic notification to announce an impending transaction for a retail product, such as limited-release footwear, exclusive-release apparel, special-release of high-end watches or designer fashions, etc. As noted above, this notification may be broadcast during a previously announced time period, at a random or preset time within that time period, which may be known or unknown to the users receiving the broadcast message. Additional information regarding the promotion and administration of product offerings for limited-release products can be found, for example, in U.S. Patent Application Publication No. 2013/0290134 A1, which is incorporated herein by reference in its entirety and for all purposes.

After broadcasting the announcement, method 500 advances to data input/output block 505 to begin intake and processing of user requests to participate in the upcoming transaction of the limited-release retail product. In accord with the representative architecture of FIG. 12, the Product Reservation Platform 410 may open a dedicated web engine portal or temporarily enable a callable unit within a mobile app through which the system 400 receives participation requests over the Network 416 from the personal computing devices of numerous user 414A, 414B, 414C . . . 414n. Each received request may include a unique QR code that was acquired by the user before submitting their request. The unique QR code may be retrieved from a ticket to an event at a designated venue, a tangible object within the designated venue, or a merchandise receipt generated within the designated venue.

At preparation block 507, a select number of the users is added to a virtual line associated with the future transaction of the retail product. The Platform 410 may use any logically suitable service discipline to determine which users will be added and the manner in which they will be added to the virtual line. This virtual line may be generated in real-time or may be retrieved in a fillable format from a database file as part of preparation block 507. In selecting which users will be added to the line, the Product Reservation Platform 410 may accept, aggregate, and process data documenting one or more of the users completing a predefined activity or series of activities. In recompense for completing a predefined activity, the Platform 410 may automatically advance a user to a new and better position forward in the virtual line based on the received data. Additional information regarding the creation and management of virtual lines for product offerings can be found, for example, in U.S. Patent Application Publication No. 2015/0205894 A1, which is incorporated herein by reference in its entirety and for all purposes.

Method 500 of FIG. 13 continues from preparation block 507 to process block 509 and determines which of the users added to the virtual line are selected to receive the retail product. A product release event may include a single retail product that is available for winning/purchase by one participant or, alternatively, multiple retail products that are available for winning/purchase by multiple participants. At this juncture, a lone (first) user or a (first) subset of users is selected from the virtual line; each selected user will receive one of the retail products or a reservation to purchase one of the retail products. While the number of users added to the virtual line may be chosen using a random number generator (RNG), and users may be added to the line on a FCFS basis, the user(s) selected for participating in the retail transaction may be chosen from a preset position(s) within the virtual line. The virtual line may also be formatted as a lottery bin from which winners are selected on a random basis.

Prior to, contemporaneous with, or after completing process block 509, method 500 executes process block 511 to determine which of the users in the virtual line are selected to receive a cryptographic digital asset. Similar to the availability of the limited-release retail product described in the previous step, a lone (second) user may be selected to receive a single cryptographic digital asset; on the other hand, a restricted (second) set of users may be selected to each receive one of a series of cryptographic digital assets. It is desirable, for at least some implementations, that the user or users chosen to receive a cryptographic digital asset be selected from only those users that were not selected to receive one of the retail products. The cryptographic digital asset meted out at block 511 may take on any of the blockchain-secured digital assets described herein. For instance, the cryptographic digital asset may contain a unique digital asset code and, optionally, a digital-version of a retail product—be it the same as or different from the product made available for the release event. The digital asset code may include a cryptographic token with a code string that is segmented into a private key, a public key, and other information relevant to the asset (e.g., transaction data, hash pointer, etc.).

A post-launch event may give away or offer for purchase a single type of digital asset or multiple discrete types of digital assets. For instance, users may submit requests for the ability to win or right to purchase an asset in a primary (first) set of assets containing a principal (first) type of cryptographic digital assets, and/or an asset in a subordinate (second) set of assets containing an ancillary (second) type of cryptographic digital assets. Process block 511 may consequently include selecting a primary (first) group/subset of users to receive the primary (first) type of cryptographic digital asset, and a subordinate (second) group/subset of users to receive the ancillary (second) type of cryptographic digital assets. To increase the desirability of one type of asset over another, the assets contained in the primary (first) set of assets may be significantly more scarce than the assets in the subordinate (second) set of assets (e.g., primary set contains $1/100^{th}$ or $1/1000^{th}$ the number of assets available in the subordinate set).

After selecting the user(s) that will receive a cryptographic digital asset as part of the post-launch event, the method 500 advances to data storage block 513 and transmits a respective cryptographic digital asset to a personal digital wallet of each selected (second) user. This transfer may first necessitate the user submitting proof of purchase or payment information for completing a purchase of the digital asset. Contemporaneous with this transfer, an electronic message is transmitted to each user notifying them of the transfer and providing a unique key with a hashed address to access the cryptographic token. Method 500 of FIG. 13 advances from data storage block 513 to data input/output block 515 and transmits the unique digital asset code, owner ID, transaction data, etc., to a distributed blockchain ledger to record on a distinct record block the transfer of the cryptographic digital asset to the user.

It may be desirable to monitor subsequent transfers of a limited-release product and/or a digital asset in order to accumulate corresponding user data and derive therefrom estimated consumer use information. By way of example, the method 500 may generate a distinct cryptographic digital asset to secure each transacted retail product. For each selected (first) user, method 500 may track a time of custody between the initial transfer of the retail product's cryptographic digital asset to that user's personal digital wallet and a subsequent transfer of the retail product's cryptographic digital asset to a third-party digital wallet of another user. The method 500 may then determine if the selected (first) user's time of custody is below a predefined "acceptable" minimum hold time of the cryptographic digital asset. If not, the method 500 may automatically output a scalping notification to the manufacturer/retailer notifying them that the personal account of the selected (first) user may need to be constrained or temporarily or permanently suspended. As yet a further option, a smart contract may be generated to authenticate ownership of and to track future transaction of the cryptographic digital asset.

Aspects of this disclosure may be implemented, for example, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

As noted in the disclosure, the present system may utilize public or private blockchain infrastructures, distributed ledgers, append-only databases, and the like. In one example, the presently described cryptographically secured digital assets may initially be stored/secured to a private blockchain that resides on infrastructure maintained by a single entity, or consortium of entities. Each entity may agree upon a common form, or data construct for the infrastructure, though assets of any one entity may be maintained by that entity. Such a model may provide for the sharing of network and infrastructure costs/resources, while permitting each entity to maintain their own asset independence. To further public trust, assets created on this private or semi-private blockchain may be transferrable to public chains at the discretion of the user (potentially subject to one or more conditions of transfer).

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features. Additional features may be reflected in the following clauses:

Clause 1: a method of brand promotion using cryptographic digital assets, the method comprising: provisioning a plurality of non-fungible tokens, each registered with an immutable database or blockchain, and each corresponding to a unique digital asset; associating each token with a unique, machine readable identification code; providing each machine readable identification code to a different respective individual from a plurality of individuals; providing software code to a user device associated with at least one of the plurality of individuals; wherein the user device includes a camera, a display, and a location recognition circuit, the software code configured to: cause the user device to discover a virtual image within a real-world environment, display a prompt, via the display, for the user to scan the machine readable identification code upon discovery of the virtual image; recognize a machine readable identification code, and cause the token associated with the machine readable identification code to be transferred to a digital locker associated with the individual or user device.

Clause 2: the method of clause 1, wherein the token includes genotypic information corresponding to one or more phenotypic expressions of a virtual object.

Clause 3: the method of any of clauses 1-2, wherein the software code causes the user device to discover the virtual image within the real-world environment via augmented reality.

Clause 4: the method of any of clauses 1-3, wherein the software code causes the user device to recognize an environment according to an optical image perceived by the camera and a location determined by the location recognition circuit; display the optical image on the display, overlay the displayed optical image with the virtual image at a predetermined location within the displayed environment.

Clause 5: the method of any of clauses 1-4, wherein the unique digital asset includes a virtual object comprising a plurality of attributes, and where each attribute is determinable, at least in part, according to a portion of code associated with the token of that unique digital asset.

Clause 6: the method of clause 5, wherein at least one of the plurality of attributes is influenced in its expression by use of the virtual object.

Clause 7: the method of any of clauses 1-6, wherein the location recognition circuit is a GPS receiver.

Clause 8: a method of brand promotion using cryptographic digital assets, the method comprising: provisioning a plurality of non-fungible tokens, each registered with an immutable database or blockchain, and each corresponding to a different respective physical retail product selected from a plurality of physical retail products; associating each token with a unique, machine readable identification code; providing the machine readable identification code associated with a first physical retail product to a retail purchaser of the first physical retail product; receiving a request from a user device associated with the retail purchaser to transfer the non-fungible token associated with the first physical retail product to a digital locker associated with the retail purchaser or user device, wherein the request includes a code included in or derived from the machine readable identification code associated with the first physical retail product.

Clause 9: the method of clause 8, further comprising initiating a request to the immutable database or blockchain to transfer the non-fungible token associated with the first physical retail product to the digital locker associated with the retail purchaser.

Clause 10: the method of any of clauses 8-9, further comprising: providing software code to the user device; wherein the user device includes a camera, a display, and a location recognition circuit, the software code configured to: cause the user device to discover a virtual image within a real-world environment, display a prompt, via the display, for the user to scan the machine readable identification code upon discovery of the virtual image; and recognize a machine readable identification code.

Clause 11: the method of clause 10, wherein the software code causes the user device to recognize the machine readable identification code through at least one of optical recognition via the camera, RFID, NFC, or BLUETOOTH communications.

Clause 12: the method of any of clauses 8-11 wherein providing the machine readable identification code associated with a first physical retail product to a retail purchaser of the first physical retail product includes at least one of: including the machine readable identification code on a tag, label, or sticker attached to the first retail product; printing the machine readable identification code on a box, container, or packaging material enclosing the first physical retail product; printing the machine readable identification code on a receipt provided to the retail purchaser; printing a first portion of the machine readable identification code on the box, container, or packaging material enclosing the first physical retail product, and printing a second portion of the machine readable identification code on a receipt provided to the retail purchaser.

Clause 13: the method of clause 12, wherein the software code causes the user device to discover the virtual image within the real-world environment via augmented reality.

Clause 14: the method of any of clauses 12-13, wherein the software code causes the user device to recognize an environment according to an optical image perceived by the camera and a location determined by the location recognition circuit; display the optical image on the display, overlay the displayed optical image with the virtual image at a predetermined location within the displayed environment.

Clause 15: the method of any of clauses 8-14, wherein the token includes genotypic information corresponding to one or more phenotypic expressions of a virtual obj ect.

Clause 16: the method of any of clauses 8-15, wherein the unique digital asset includes a virtual object comprising a plurality of attributes, and where each attribute is determinable, at least in part, according to a portion of code associated with the token of that unique digital asset.

Clause 17: the method of clause 16, wherein at least one of the plurality of attributes is influenced in its expression by use of the virtual object.

Clause 18: a method comprising: providing a virtual object to a user, wherein the virtual object includes a plurality of attributes, and wherein each attribute of the plurality of attributes is at least partially derived from a code associated with a non-fungible token registered to an immutable database or blockchain.

Clause 19: the method of clause 18, wherein providing the virtual object to the user includes causing the non-fungible token to be transferred to an account associated with the user.

Clause 20: the method of clause 19, further comprising receiving value from the user in consideration for causing the non-fungible token to be transferred to the account associated with the user.

Clause 21: the method of any of clauses 18-20, wherein providing the virtual object to the user includes making the virtual object available to the user within a video game.

Clause 22: the method of clause 21, wherein the video game includes an avatar, character, or athlete within a virtual environment, and wherein the avatar, character, or athlete is controlled by user input received via a user device.

Clause 23: the method of clause 22, wherein the virtual object is an article of footwear or an article of apparel.

Clause 24: the method any of clauses 22-23, wherein the avatar, character, or athlete includes a plurality of character attributes, each having a respective attribute score that affects a behavior, performance, or ability of the avatar, character, or athlete within the environment; and wherein integration of the virtual object with the avatar, character, or athlete operatively modifies at least one attribute score.

Clause 25: the method of clause 21, wherein the video game is a digital collectable card game, and wherein the virtual object is represented as a digital collectable card.

Clause 26: the method of any of clauses 21-25, further comprising providing an indication of the use of the virtual object within the video game to a remote server, and wherein the indication of use of the virtual object is operative to alter at least one of the plurality of attributes of the virtual object.

Clause 27: a computerized system for implementing any of the methods of clauses 1-16.

Clause 28: a method for automating generation of cryptographic digital assets associated with articles of footwear, each of the articles of footwear including an upper for attaching to a foot of a user and a sole structure attached to the upper for supporting thereon the foot of the user, the method comprising: receiving, via a middleware server computer over a distributed computing network from a remote computing node, a transaction confirmation indicative of a validated transfer of an article of footwear from a first party to a second party; determining, via the middleware server computer from an encrypted relational database, a unique owner identification (ID) code associated with the second party; generating a cryptographic digital asset associated with the article of footwear, the cryptographic digital asset including a digital shoe and a unique digital shoe ID code; linking, via the middleware server computer, the cryptographic digital asset with the unique owner ID code; and transmitting, via the middleware server computer to a distributed blockchain ledger, the unique digital shoe ID code and the unique owner ID code to record transfer of the cryptographic digital asset to the second party on a transaction block.

Clause 29: the method of clause 28, wherein the unique digital shoe ID code includes a cryptographic token key with a code string segmented into a series of code subsets, wherein a first plurality of the code subsets includes data indicative of attributes of the digital shoe.

Clause 30: the method of clause 29, wherein the first plurality of the code subsets includes genotype and phenotype data for the digital shoe.

Clause 31: the method of any of clauses 29-30, wherein a second plurality of the code subsets includes data indicative of attributes of the article of footwear.

Clause 32: the method of clause 31, wherein the second plurality of the code subsets includes colorway, materials, manufacturing, make, and/or model data for the article of footwear.

Clause 33: the method of any of clauses 28-32, further comprising: responsive to receiving the transaction confirmation, transmitting a notification to the second party with information for accessing the cryptographic digital asset; and receiving, via the middleware server computer from a handheld personal computing device of the second party, a scanning confirmation verifying a universal product code (UPC) and/or a unique product identifier number (UPIN) corresponding to a make and a model of the article of footwear has been scanned, wherein linking the cryptographic digital asset with the unique owner ID code is responsive to receipt of the scanning confirmation.

Clause 34: the method of any of clauses 28-33, further comprising, responsive to receiving the transaction confirmation, transmitting a notification to the second party with a unique key with a hashed address to a cryptographic token.

Clause 35: the method of any of clauses 28-34, further comprising: receiving a digital breeding solicitation with a request to intermingle the cryptographic digital asset with a third-party cryptographic digital asset; and generating a progeny cryptographic digital asset with a combination of one or more features from the cryptographic digital asset and one or more features from the third-party cryptographic digital asset.

Clause 36: the method of clause 35, wherein: the unique digital shoe ID code includes a first cryptographic token key with a first code string segmented into a series of first code subsets, a first of the first code subsets including data indicative of attributes of the digital shoe; the third-party cryptographic digital asset includes a second cryptographic token key with a second code string segmented into a series of second code subsets, a first of the second code subsets including data indicative of attributes of a third-party digital shoe; and the progeny cryptographic digital asset includes a third cryptographic token key with a third code string segmented into a series of third code subsets, a first of the third code subsets including the data from the first of the first code subsets, and a second of the third code subsets including the data from the first of the second code subsets.

Clause 37: the method of clause 36, wherein the first of the first and third code subsets both share a first distinct alphanumeric sequence, and wherein the first of the second code subsets and the second of the third code subsets share a second distinct alphanumeric sequence.

Clause 38: the method of any of clauses 36-37, wherein generating the progeny cryptographic digital asset includes applying a random number generator to: designate one of the cryptographic digital asset or the third-party cryptographic digital asset as a sire; designate another of the cryptographic digital asset or the third-party cryptographic digital asset as a dam; and determine which of the third code subsets corresponds to which of the first code subsets and which of the of third code subsets correspond to which of the second code subsets.

Clause 39: the method of any of clauses 28-38, further comprising: receiving a digital transfer proposal with a request to transfer the cryptographic digital asset to a third party; determining a new unique owner ID code associated with the third party; linking the cryptographic digital asset with the new unique owner ID code; and transmitting the unique digital shoe ID code and the new unique owner ID code to the distributed blockchain ledger for recordation on a new transaction block.

Clause 40: the method of clause 39, further comprising receiving a new transaction confirmation indicative of a new validated transfer of the article of footwear from the second party to the third party.

Clause 41: the method of any of clauses 28-40, further comprising generating, via the middleware server computer, a smart contract operable to authenticate ownership and to track future transaction of the cryptographic digital asset.

Clause 42: the method of any of clauses 28-41, wherein the unique owner ID code is linked with a cryptocurrency wallet registered with the distributed blockchain ledger.

Clause 43: the method of any of clauses 28-42, wherein the transaction confirmation includes a universal product code (UPC) and/or a unique product identifier number (UPIN) corresponding to a make and a model of the article of footwear.

Clause 44: a decentralized computing system for automating generation of cryptographic digital assets associated with articles of footwear, each of the articles of footwear including an upper for attaching to a foot of a user and a sole structure attached to the upper for supporting thereon the foot of the user, the decentralized computing system comprising: a wireless communications device configured to connect with a remote computing node over a distributed computing network; a cryptographic digital asset registry storing digital shoes and unique digital shoe ID codes associated with multiple cryptographic digital assets; and a middleware server computer operatively connected to the wireless communications device and the cryptographic digital asset registry, the middleware server computer being programmed to: receive, over the distributed computing network from the remote computing node, an electronic transaction confirmation indicative of a validated transfer of an article of footwear from a first party to a second party; retrieve, from an encrypted relational database, a unique owner identification (ID) code associated with the second party; generate a cryptographic digital asset associated with the article of footwear, the cryptographic digital asset including a digital shoe and a unique digital shoe ID code; link the cryptographic digital asset with the unique owner ID code in the cryptographic digital asset registry; and transmit the unique digital shoe ID code and the unique owner ID code to a distributed blockchain ledger to record transfer of the cryptographic digital asset to the second party on a transaction block.

Clause 45: the decentralized computing system of clause 44, wherein the unique digital shoe ID code includes a cryptographic token key with a code string segmented into a series of code subsets, wherein a first plurality of the code subsets includes data indicative of attributes of the digital shoe.

Clause 46: the decentralized computing system of clause 45, wherein a second plurality of the code subsets includes data indicative of attributes of the article of footwear.

Clause 47: the decentralized computing system of any of clauses 44-45, wherein the middleware server computer is further programmed to: responsive to receiving the transaction confirmation, transmit a digital notification to the second party with information for accessing the cryptographic digital asset; and receive, from a handheld personal computing device of the second party, a scanning confirmation verifying a universal product code (UPC) and/or a unique product identifier number (UPIN) corresponding to a make and a model of the article of footwear has been scanned, wherein linking the cryptographic digital asset with the unique owner ID code is responsive to receipt of the scanning confirmation.

Clause 48: the decentralized computing system of any of clauses 44-47, wherein the middleware server computer is further programmed to, responsive to receiving the transaction confirmation, transmit a digital notification to the second party with a unique key with a hashed address to the cryptographic token.

Clause 49: the decentralized computing system of any of clauses 44-48, wherein the middleware server computer is further programmed to: receive a digital breeding bid from the second party with a request to intermingle the cryptographic digital asset with a third-party cryptographic digital asset; and generate a progeny cryptographic digital asset with a combination of one or more features from the cryptographic digital asset and one or more features from the third-party cryptographic digital asset.

Clause 50: the decentralized computing system of clause 49, wherein: the unique digital shoe ID code includes a first cryptographic token key with a first code string segmented into a series of first code subsets, a first of the first code subsets including data indicative of attributes of the digital shoe; the third-party cryptographic digital asset includes a second cryptographic token key with a second code string segmented into a series of second code subsets, a first of the second code subsets including data indicative of attributes of a third-party digital shoe; and the progeny cryptographic digital asset includes a third cryptographic token key with a third code string segmented into a series of third code subsets, a first of the third code subsets including the data from the first of the first code subsets, and a second of the third code subsets including the data from the first of the second code subsets.

Clause 51: the decentralized computing system of clause 50, wherein generating the progeny cryptographic digital asset includes applying a random number generator to: designate one of the cryptographic digital asset or the third-party cryptographic digital asset as a sire; designate another of the cryptographic digital asset or the third-party cryptographic digital asset as a dam; and determine which of the of third code subsets correspond to the first code subsets and which of the of third code subsets correspond to the second code subsets.

Clause 52: the decentralized computing system of any of clauses 44-51, wherein the middleware server computer is further programmed to: receive a digital transfer proposal with a request to transfer the cryptographic digital asset to a third party; determine a new unique owner ID code associated with the third party; link the cryptographic digital asset with the new unique owner ID code; and record the unique digital shoe ID code and the new unique owner ID code on a new transaction block with the distributed blockchain ledger.

Clause 53: a method of event-based distribution of a cryptographic digital asset comprises: receiving, from a computing device associated with a user, an indication that the computing device is located at a predetermined venue within a predetermined window of time; receiving, from the computing device, a unique owner identification (ID) code associated with the user; receiving, from the computing device, a unique code acquired by the user; determining a unique digital asset ID code corresponding to the received unique code, the unique digital asset ID code representative of the cryptographic digital asset; and transmitting a cryptographic block to a distributed blockchain ledger to record transfer of the cryptographic digital asset to the user, the cryptographic block comprising both the unique digital asset ID code and the unique owner ID code.

Clause 54: the method of clause 53, wherein the cryptographic digital asset includes genotype data representative of a digital shoe or article of apparel.

Clause 55: the method of clause 53, wherein the cryptographic digital asset includes genotype data that is representative of an attribute of a digital shoe or article of apparel though is not representative of an entire digital shoe or article of apparel.

Clause 56: the method of clause 55, further comprising modifying a preexisting digital asset having genotype data representative of a digital shoe or article of apparel using the genotype data representative of the attribute of a digital shoe or article of apparel.

Clause 57: the method of any of clauses 53-56, wherein the indication that the computing device is located at the predetermined venue comprises an indication of whether GPS coordinates of the computing device are within a predefined geofence or closed geographic boundary.

Clause 58: the method of any of clauses 53-57, wherein the indication that the computing device is located at the predetermined venue comprises an indication of whether the computing device is in proximity to an 802.11 or BLUETOOTH beacon.

Clause 59: the method of any of clauses 53-58, wherein the indication that the computing device is located at the predetermined venue comprises an image acquired by the computing device, or a representation thereof, from which one or more visual attributes of the venue may be identified.

Clause 60: the method of any of clauses 53-59, wherein the received unique code comprises a code acquired from a ticket to an event at the venue.

Clause 61: the method of any of clauses 53-59, wherein the received unique code comprises a code that is scanned from a tangible object within the venue or from a merchandise receipt generated within the venue.

Clause 62: the method of any of clauses 53-61, further comprising receiving an indication that a conditional event has occurred during the predetermined window of time; and wherein the transmitting of the cryptographic block to the distributed blockchain ledger occurs only after the indication is received that the conditional event has occurred.

Clause 63: the method of any of clauses 53-62, wherein determining the unique digital asset ID code comprises: directing an application or an internet browser running on the computing device to a virtual storefront display comprising a plurality of different displayed cryptographic digital assets; receiving an indication of a selection of one of the plurality of different displayed cryptographic digital assets; and wherein the determined unique digital asset ID code corresponds to both the received unique code and the selected one of the plurality of different displayed cryptographic digital assets.

Clause 64: the method of any of clauses 53-63, further comprising: receiving a digital transfer proposal with a request to transfer the cryptographic digital asset to an acquiring party; determining a unique owner ID code of the acquiring party; linking the cryptographic digital asset with the unique owner ID code of the acquiring party; and transmitting the unique digital asset ID code and the unique owner ID code of the acquiring party to the distributed blockchain ledger for recordation on a new transaction block.

Clause 65: the method of any of clauses 53-64, wherein the unique digital asset ID code includes a cryptographic token key with a code string segmented into a series of code subsets, wherein a first plurality of the code subsets includes genotype data corresponding to one or more phenotypic expressions the digital asset.

Clause 66: the method of clause 65, wherein the digital asset is a computer-generated digital shoe.

Clause 67: the method of clause 66, wherein the plurality of attributes of the computer-generated digital shoe includes at least one of: colorway, materials, manufacturing, make, and/or model data.

Clause 68: the method of clause 65, further comprising exporting at least one of the digital asset ID code or at least one of the plurality of attributes of the digital asset to a digital video game application such that the digital asset is represented within the digital application and modifies one or more aspects of the gameplay of the digital video game application.

What is claimed:

1. A computing system for provisioning cryptographic digital assets, the computing system comprising:
   a communications device configured to connect with a distributed computing network;
   a data storage device configured to store user data for use in a virtual line or bin associated with a future transaction of physical retail products; and
   a server computer operatively connected to the communications device and the data storage device, the server computer being programmed to:
      broadcast, over the distributed computing network, an electronic notification of the future transaction of the physical retail products;
      receive, over the distributed computing network from personal computing devices of multiple users, requests to participate in the future transaction;

add a select number of the users to the virtual line or bin associated with the future transaction of the physical retail products;

select, from the users added to the virtual line or bin, a first subset of users each designated to receive a respective one of the physical retail products;

select, from the users added to the virtual line or bin and not selected for the first subset of users, a second subset of users each designated to receive a respective one of the cryptographic digital assets, each of the cryptographic digital assets including a digital object and a unique digital asset code;

request transfer of each of the cryptographic digital assets to a respective digital wallet of a corresponding one of the users of the second subset of users; and transmit each of the unique digital asset codes to a distributed blockchain ledger to record, on a distinct record block, the transfer of the cryptographic digital asset to the corresponding one of the users of the second subset of users.

2. The computing system of claim 1, wherein each of the unique digital asset codes includes a respective cryptographic token with a unique code string segmented into a private key and a public key.

3. The computing system of claim 1, wherein each of the digital objects includes a virtual representation of one of the physical retail products, a unique design rendering of a physical object, and/or a unique design file of an object.

4. The computing system of claim 1, wherein the digital objects of the cryptographic digital assets are distinct from one another.

5. The computing system of claim 1, wherein the cryptographic digital assets include: a first asset set with a first type of cryptographic digital assets, and a second asset set with a second type of cryptographic digital assets distinct from the first type of cryptographic digital assets.

6. The computing system of claim 5, wherein the second subset of users includes: a first subset group designated to receive the first type of cryptographic digital assets from the first asset set, and a second subset group designated to receive the second type of cryptographic digital assets from the second asset set.

7. The computing system of claim 6, wherein the first asset set includes a first number of the first type of cryptographic digital assets, and the second asset set includes a second number, distinct from the first number, of the second type of cryptographic digital assets.

8. The computing system of claim 1, wherein the server computer is further programmed to:

confirm transfer of each of the cryptographic digital assets to the respective digital wallet of the corresponding one of the users of the second subset of users; and transmit, to each of the users of the second subset of users, an electronic message including a unique key with a unique hashed address to a unique cryptographic token.

9. The computing system of claim 1, wherein the electronic notification is broadcast during a previously announced time period and at a random or preset time within the previously announced time period that is unknown to the users from which the requests are received.

10. The computing system of claim 1, wherein the server computer is further programmed to:

receive, from one of the personal computing devices of one of the users, activity data indicating that the one of the users completed a predefined activity; and advance the one of the users to a new position forward in the virtual line or bin based on the received activity data.

11. The computing system of claim 1, wherein the select number of the users added to the virtual line or bin is output via a random number generator (RNG).

12. The computing system of claim 1, wherein the server computer is further programmed to:

associate a second cryptographic digital asset with the respective physical retail product of a first user in the first subset of users;

track, for the first user, a time of custody between a transfer of the second cryptographic digital asset to a first digital wallet of the first user and a subsequent transfer of the second cryptographic digital asset to a third-party digital wallet of a third user;

determine if the time of custody is below a predefined minimum hold time of the second cryptographic digital asset; and output a scalping notification in response to a determination that the time of custody is below the predefined minimum hold time.

13. The computing system of claim 12, wherein the server computer is further programmed to generate a smart contract operable to authenticate ownership of and to track future transaction of the second cryptographic digital asset.

14. The computing system of claim 1, wherein each of the cryptographic digital assets includes respective genotype data representative of an appearance trait of the digital object, the digital object including a digital shoe or a digital article of apparel.

15. The computing system of claim 1, wherein each of the received requests to participate in the future transaction includes a unique quick reference (QR) code acquired by the user from a ticket to an event at a designated venue, a tangible object within the designated venue, or a merchandise receipt generated within the designated venue.

16. A computing system for provisioning cryptographic digital assets, the computing system comprising:

a communications device configured to connect with a distributed computing network;

a data storage device configured to store user data for use in a virtual line or bin associated with a future transaction of a physical retail product; and a server computer operatively connected to the communications device and the data storage device, the server computer being programmed to:

broadcast, over the distributed computing network, an electronic notification of the future transaction of the physical retail product;

receive, over the distributed computing network from personal computing devices of multiple users, requests to participate in the future transaction;

add a select number of the users to the virtual line or bin associated with the future transaction of the physical retail product;

select, from the users added to the virtual line or bin, a first user to receive the physical retail product and a second user to receive a first cryptographic digital asset including a digital object and a unique digital asset code;

request transfer of the first cryptographic digital asset to a second digital wallet of the second user;

request transfer of a second cryptographic digital asset associated with the physical retail product to a first digital wallet of the first user;

track a time of custody between the transfer of the second cryptographic digital asset to the first digital wallet of the first user and a subsequent transfer of the second cryptographic digital asset to a third-party digital wallet of a third user;

determine if the time of custody is below a predefined minimum hold time; and output a scalping notification in response to a determination that the time of custody is below the predefined minimum hold time.

17. The computing system of claim 16, wherein the unique digital asset code includes a cryptographic token with a unique code string segmented into a private key and a public key.

18. The computing system of claim 16, wherein the digital object includes a virtual representation of the physical retail product, a unique design rendering of a physical object, and/or a unique design file of an object.

19. The computing system of claim 16, wherein the server computer is further programmed to:

confirm transfer of the first cryptographic digital asset to the second digital wallet of the second user and transfer of the second cryptographic digital asset to the first digital wallet of the first user; and transmit, to each of the first and second users, an electronic message including a unique key with a unique hashed address to a unique cryptographic token.

20. The computing system of claim 16, wherein the electronic notification is broadcast during a previously announced time period and at a random or preset time within the previously announced time period that is unknown to the users from which the requests are received.

21. The computing system of claim 16, wherein the server computer is further programmed to:

receive, from one of the personal computing devices of one of the users, activity data indicating that the one of the users completed a predefined activity; and advance the one of the users to a new position forward in the virtual line or bin based on the received activity data.

22. The computing system of claim 16, wherein the select number of the users added to the virtual line or bin is output via a random number generator (RNG).

23. The computing system of claim 16, wherein the server computer is further programmed to generate a smart contract operable to authenticate ownership of and to track future transaction of the second cryptographic digital asset.

24. The computing system of claim 16, wherein the first cryptographic digital asset includes genotype data representative of an appearance trait of the digital object, the digital object including a digital shoe or a digital article of apparel.

25. The computing system of claim 16, wherein each of the received requests to participate in the future transaction includes a unique quick reference (QR) code acquired by the user from a ticket to an event at a designated venue, a tangible object within the designated venue, or a merchandise receipt generated within the designated venue.

* * * * *